(12) United States Patent
Raposo et al.

(10) Patent No.: US 12,070,146 B2
(45) Date of Patent: Aug. 27, 2024

(54) COOKING DEVICE AND COMPONENTS THEREOF

(71) Applicant: SHARKNINJA OPERATING LLC, Needham, MA (US)

(72) Inventors: Danny Martins Raposo, Lincoln, RI (US); Roger Neil Jackson, Cornwall (GB); Christopher Patrick Smith, Newton, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 0 days.

(21) Appl. No.: 17/139,490

(22) Filed: Dec. 31, 2020

(65) Prior Publication Data

US 2021/0120997 A1    Apr. 29, 2021

(51) Int. Cl.
A47J 27/086    (2006.01)
A47J 27/08     (2006.01)

(52) U.S. Cl.
CPC ......... *A47J 27/086* (2013.01); *A47J 27/0802* (2013.01)

(58) Field of Classification Search
CPC .. F24C 15/00; F24C 15/02; F24C 7/00; F24C 219/401; F24C 426/233; F24C 426/509; F24C 426/523; F24C 7/085; F24C 15/16; F24C 15/164; F24C 15/166; F24C 7/04; F24C 7/08; A21B 1/22; A21B 1/26; A47J 27/04; A47J 27/08; A47J 27/0802; A47J 27/086; A47J 27/004; A47J 37/0641; A47J 2027/043; A47J 27/09; A47J 27/0804; A47J 36/06; A47J 36/32; A47J 37/0629;

(Continued)

(56) References Cited

U.S. PATENT DOCUMENTS 3,974,696 A    8/1976   Fitzmayer
4,036,995 A    7/1977   Koether et al.
(Continued)

FOREIGN PATENT DOCUMENTS

AT    517611 B1      3/2017
CN    101032369 A    9/2007
(Continued)

OTHER PUBLICATIONS

RHS Hermetic Seals PN CCBNCFS12-MS610V0, https://www.rhseals.com/product/bnc-hermetic-seal-2/ (Year: 2009).*
(Continued)

*Primary Examiner* — Dana Ross
*Assistant Examiner* — Adam M Eckardt
(74) *Attorney, Agent, or Firm* — Mintz, Levin, Cohn, Ferris, Glovsky and Popeo, P.C.

(57) ABSTRACT

A cooking system for cooking food includes a housing defining a hollow chamber configured to receive the food, a lid movable relative to said housing between an open position and a closed position to form a pressure-tight cooking volume between said hollow chamber and said lid, at least one heating element associated with at least one of said housing and said lid, and a temperature probe positionable within said pressure-tight cooking volume. The cooking system is operable in a pressure cooking mode and during said pressure cooking mode. The temperature probe is operable to detect a temperature of the food in said pressure-tight cooking volume.

15 Claims, 18 Drawing Sheets

(58) Field of Classification Search
CPC .. A47J 37/0664; A47J 2202/00; A47J 27/088;
A47J 27/092; A47J 36/321; A47J
37/0623; A47J 27/002; A47J 27/0806;
A47J 27/0813; A47J 27/0817; A47J
27/10; A47J 36/10; A47J 36/12; A47J
37/0676; A47J 37/0754; A47J 37/1266;
A47J 39/003; A47J 43/0772; A47J 44/00;
A47J 37/06; A47J 27/00; A47J 37/12;
A47J 39/00; B21B 13/023; B21B 31/02;
A23L 5/15; A23L 5/17; A23L 3/003;
A23L 3/015; A23L 5/13; A23L 5/10;
A23L 3/00; A23V 2002/00; A23V
2300/24; H05B 6/1236; H05B 6/129;
H05B 1/0263; H05B 2213/06; H05B
3/0076; H05B 6/062; H05B 6/105; H05B
6/1209; H05B 6/1245; H05B 6/6435;
H05B 6/6441; H05B 6/6444; H05B
6/6447; H05B 6/6467; H05B 6/668;
H05B 6/687; H05B 6/705; H05B 6/12;
H05B 3/00; H05B 6/06; H05B 6/10;
H05B 6/64; H05B 6/66; H05B 6/68;
H05B 6/70; F16K 17/06; G05B 19/0426;
G05B 2219/2643; G05B 19/042; G01K
1/026; G01K 1/08; G01K 1/14; G01K
2207/06; G05D 23/19; G05D 23/1917;
G06T 2207/20084; G06T 7/0002; G06T
7/62; G06T 7/70; G06T 7/00; G06V
10/40; G06V 20/68; H04N 5/232; H04N
5/2353; H04N 7/188; H04N 9/735; Y02B
40/00; H01R 13/20; H01R 13/4536;
H01R 13/508; H01R 13/5219; H01R
13/523; H01R 13/582; H01R 13/6205;
H01R 13/6275; H01R 13/6584; H01R
13/6658; H01R 24/50; H01R 24/58;
H01R 39/64; H01R 43/16; H01R
426/523; H01R 426/233; H01R 426/509;
H01R 219/40; H01R 219/401; H01R
29/876; H01R 439/271; H01R 99/333;
H01R 99/337; H01R 13/52; H01R 13/58;
H01R 13/62; H01R 13/625; H01R 13/66
See application file for complete search history.

(56) References Cited

U.S. PATENT DOCUMENTS

| | | | |
|---|---|---|---|
| 4,081,645 A | 3/1978 | Javes et al. |
| 4,086,813 A | 5/1978 | Meek et al. |
| 4,122,322 A | 10/1978 | Ohkubo et al. |
| 4,217,477 A | 8/1980 | Matsubara et al. |
| 4,233,478 A | 11/1980 | Stahl et al. |
| 4,309,585 A | 1/1982 | Doi et al. |
| 4,370,535 A | 1/1983 | Noda |
| 4,617,441 A | 10/1986 | Koide et al. |
| 5,973,300 A | 10/1999 | Tomohiro |
| 7,102,107 B1 | 9/2006 | Chapman |
| 7,128,466 B2 | 10/2006 | Chang et al. |
| 7,516,692 B2 | 4/2009 | Pirkle et al. |
| 7,605,349 B2 | 10/2009 | Gaynor et al. |
| 7,820,947 B2 | 10/2010 | Gaynor et al. |
| 8,766,144 B2 | 7/2014 | McLoughlin et al. |
| 8,931,400 B1 | 1/2015 | Allen |
| 9,017,751 B2 | 4/2015 | Rauh |
| 9,089,006 B2 | 7/2015 | Cho et al. |
| 9,191,998 B2 | 11/2015 | Hegedis et al. |
| 9,398,640 B2 | 7/2016 | Bhaidasna et al. |
| 9,427,107 B2 | 8/2016 | Reinhart |
| 9,474,413 B2 | 10/2016 | Romandy |
| 10,024,544 B2 | 7/2018 | Bhogal et al. |
| 10,085,584 B2 | 10/2018 | Johncock et al. |
| 10,130,205 B2 | 11/2018 | Fung et al. |
| 10,397,989 B1 | 8/2019 | Albahkali et al. |
| 10,485,378 B2 | 11/2019 | Gill et al. |
| 10,527,290 B2 | 1/2020 | Armstrong |
| 10,551,893 B2 | 2/2020 | Knappenberger et al. |
| 10,591,166 B2 | 3/2020 | Reinhart |
| 10,599,168 B2 | 3/2020 | Raghavan et al. |
| 10,617,252 B2 | 4/2020 | He et al. |
| 10,646,070 B2 | 5/2020 | Gill et al. |
| 10,653,270 B2 | 5/2020 | Gill et al. |
| 10,660,472 B2 | 5/2020 | Gill et al. |
| 10,674,853 B2 | 6/2020 | Huang |
| 10,674,854 B2 | 6/2020 | Huang |
| 10,674,868 B2 | 6/2020 | Gill et al. |
| 10,682,011 B2 | 6/2020 | Gill et al. |
| 10,694,882 B2 | 6/2020 | Huang |
| 10,720,077 B2 | 7/2020 | Vengroff et al. |
| 10,732,054 B2 | 8/2020 | Calhoun, Jr. et al. |
| 11,109,710 B2 * | 9/2021 | Gill .......... A47J 27/04 |
| 2004/0170214 A1 | 9/2004 | Rund |
| 2006/0222050 A1 | 10/2006 | Byrne et al. |
| 2008/0043809 A1 | 2/2008 | Herbert |
| 2008/0053984 A1 | 3/2008 | Gaynor et al. |
| 2010/0310733 A1 * | 12/2010 | Hoffman ............ F24C 7/00 426/233 |
| 2012/0288595 A1 | 11/2012 | Randall et al. |
| 2013/0291740 A1 | 11/2013 | Seitz |
| 2016/0036161 A1 * | 2/2016 | Brown ............ H01R 13/5219 439/271 |
| 2017/0013681 A1 | 1/2017 | Lee et al. |
| 2017/0089590 A1 * | 3/2017 | Bruin-Slot ............ F24C 15/166 |
| 2017/0138797 A1 | 5/2017 | Brown et al. |
| 2017/0167733 A1 | 6/2017 | Bockler et al. |
| 2017/0199086 A1 | 7/2017 | Faraldi et al. |
| 2018/0143083 A1 | 5/2018 | Pastore et al. |
| 2018/0324908 A1 * | 11/2018 | Denker ............ G06T 7/0002 |
| 2018/0364107 A1 | 12/2018 | Kessler et al. |
| 2019/0261465 A1 | 8/2019 | Meng et al. |
| 2019/0277498 A1 | 9/2019 | Fernandez et al. |
| 2019/0327795 A1 | 10/2019 | Hannah et al. |
| 2019/0327796 A1 | 10/2019 | Hannah et al. |
| 2019/0350400 A1 | 11/2019 | Leeuwen et al. |
| 2019/0374064 A1 | 12/2019 | Gill et al. |
| 2020/0007518 A1 | 1/2020 | Funk |
| 2020/0085225 A1 | 3/2020 | Kim et al. |
| 2020/0088588 A1 | 3/2020 | Moon et al. |
| 2020/0093327 A1 | 3/2020 | Hua |
| 2020/0156563 A1 | 5/2020 | Reinhart |
| 2020/0187712 A1 | 6/2020 | Gill et al. |
| 2020/0253410 A1 | 8/2020 | Smith |
| 2020/0281390 A1 | 9/2020 | Li et al. |

FOREIGN PATENT DOCUMENTS

| | | |
|---|---|---|
| CN | 201727388 U | 2/2011 |
| CN | 202751199 U | 2/2013 |
| CN | 203555603 U | 4/2014 |
| CN | 204133140 U | 2/2015 |
| CN | 204202805 U | 3/2015 |
| CN | 204410529 U | 6/2015 |
| CN | 204633037 U | 9/2015 |
| CN | 204722859 U | 10/2015 |
| CN | 105628252 A | 6/2016 |
| CN | 206007016 U | 3/2017 |
| CN | 106786268 A | 5/2017 |
| CN | 106821017 A | 6/2017 |
| CN | 206381055 U | 8/2017 |
| CN | 206496849 U | 9/2017 |
| CN | 206557593 U | 10/2017 |
| CN | 207081498 U | 3/2018 |
| CN | 207163585 U | 3/2018 |
| CN | 207370549 U | 5/2018 |
| CN | 108844654 A | 11/2018 |
| CN | 208582194 U | 3/2019 |
| CN | 109770724 A | 5/2019 |
| CN | 110129706 A | 8/2019 |
| CN | 110146183 A | 8/2019 |
| CN | 209214800 U | 8/2019 |

(56) References Cited

FOREIGN PATENT DOCUMENTS

| | | | |
|---|---|---|---|
| CN | 110279292 A | | 9/2019 |
| CN | 110291370 A | | 9/2019 |
| CN | 110432751 A | | 11/2019 |
| CN | 110454822 A | | 11/2019 |
| CN | 110507198 A | * | 11/2019 |
| CN | 110584489 A | | 12/2019 |
| CN | 110769724 A | | 2/2020 |
| CN | 110793657 A | | 2/2020 |
| CN | 110849499 A | | 2/2020 |
| CN | 110973981 A | | 4/2020 |
| CN | 210354389 U | | 4/2020 |
| CN | 111297226 A | | 6/2020 |
| CN | 210697198 U | | 6/2020 |
| CN | 111366262 A | | 7/2020 |
| CN | 111631597 A | | 9/2020 |
| CN | 111700508 A | | 9/2020 |
| CN | 211534043 U | | 9/2020 |
| CN | 211717659 U | | 10/2020 |
| DE | 3104926 A1 | | 8/1982 |
| DE | 4217943 A1 | | 12/1993 |
| DE | 10061821 C2 | | 11/2002 |
| DE | 20221151 U1 | | 4/2005 |
| DE | 102010010497 B4 | | 6/2013 |
| DE | 102010010498 B4 | | 6/2013 |
| DE | 102011085521 B4 | | 4/2014 |
| DE | 102015112504 A1 | | 2/2017 |
| DE | 102017006451 A1 | | 1/2019 |
| DE | 102018209566 A1 | | 12/2019 |
| DE | 202020101605 U1 | | 4/2020 |
| EP | 0921708 A1 | | 6/1999 |
| EP | 1344003 A1 | | 7/2005 |
| EP | 1485653 B1 | | 11/2005 |
| EP | 1757862 A2 | | 2/2007 |
| EP | 1525831 B1 | | 1/2008 |
| EP | 1927810 A1 | | 6/2008 |
| EP | 2026632 A2 | | 2/2009 |
| EP | 2659808 A1 | | 11/2013 |
| EP | 2606776 B1 | | 5/2014 |
| EP | 2674080 B1 | | 1/2015 |
| EP | 1937114 B1 | | 5/2016 |
| EP | 2735210 B1 | | 12/2016 |
| EP | 3108774 A1 | | 12/2016 |
| EP | 2773248 B1 | | 9/2017 |
| EP | 3248516 A1 | | 11/2017 |
| EP | 3076829 B1 | | 1/2018 |
| EP | 3143916 B1 | | 1/2018 |
| EP | 3308683 A1 | | 4/2018 |
| EP | 3333488 A1 | | 6/2018 |
| EP | 2994956 B1 | | 11/2018 |
| EP | 2879555 B1 | | 1/2019 |
| EP | 3427616 A1 | | 1/2019 |
| EP | 2939497 B1 | | 2/2019 |
| EP | 3152633 B1 | | 3/2019 |
| EP | 3479741 A1 | | 5/2019 |
| EP | 3116358 B1 | | 7/2019 |
| EP | 3616572 A1 | | 3/2020 |
| EP | 3153080 B1 | | 6/2020 |
| EP | 2999382 B1 | | 7/2020 |
| EP | 3420864 B1 | | 9/2020 |
| EP | 3714747 A1 | | 9/2020 |
| ES | 2328769 B1 | | 8/2010 |
| FR | 3014304 B1 | | 1/2016 |
| GB | 811055 A | | 3/1959 |
| GB | 1491739 A | | 11/1977 |
| GB | 2206222 A | | 12/1988 |
| KR | 20090059200 A | | 6/2009 |
| WO | 2016070220 A1 | | 5/2016 |
| WO | 2018108814 A1 | | 6/2018 |
| WO | 2018153056 A1 | | 8/2018 |
| WO | 2018216042 A1 | | 11/2018 |
| WO | 2019184188 A1 | | 10/2019 |
| WO | 2019205769 A1 | | 10/2019 |
| WO | 2019214043 A1 | | 11/2019 |
| WO | 2018149764 A1 | | 12/2019 |
| WO | 2020000052 A1 | | 1/2020 |
| WO | 2020015929 A1 | | 1/2020 |
| WO | 2020038209 A1 | | 2/2020 |
| WO | 2020056966 A1 | | 3/2020 |
| WO | 2020073868 A1 | | 4/2020 |
| WO | 2020074476 A1 | | 4/2020 |
| WO | 2020099339 A1 | | 5/2020 |
| WO | 2020145758 A1 | | 7/2020 |
| WO | 2020149281 A1 | | 7/2020 |
| WO | 2020157685 A1 | | 8/2020 |
| WO | 2020163711 A1 | | 8/2020 |
| WO | 2020174312 A1 | | 9/2020 |
| WO | 2020177323 A1 | | 9/2020 |

OTHER PUBLICATIONS

RHS Hermetic Seals Pn CCBNCFS12-MS610V0, https://www.rhseals.com/product/bnc-hermetic-seal-2/ ; https://web.archive.org/web/20140907141702/http://www.rhseals.com/bnc-hermetic-seal-2/ (Year: 2014).*

RHS Hermetic Seals Pn CCBNCFS12-MS610V0, https://www.rhseals.com/product/bnc-hermetic-seal-2/ ; https://web.archive.org/web/20140907141702/http://www.rhseals.com/bnc-hermetic-seal-.*

RHS Hermetic Seals PN CCBNCFS12-MS610V0, https://www.rhseals.com/product/bnc-hermetic-seal-2/ ; https://web.archive.org/web/20140907141702/http://www.rhseals.com/bnc-hermetic-seal- (Year: 2014).*

Glenair Part No. 947-117-25-35 B P 01 (Year: 2013).*

Encapsulated Merriam Webster Definition (Year: 2020).*

Bung Merriam Webster Definition (Year: 2020).*

AEG Australia & New Zealand, (Aug. 13, 2015) "Core Temperature Sensor—How To Use The Meat Probe", AEG—YouTube, retrieved from https://www.youtube.com/watch?v=cZ1jyLldLfQ on Aug. 7, 2021, 3 pages.

Extended European Search Report received for EP Application No. 21916251.8, mailed on Apr. 3, 2024, 5 pages.

* cited by examiner

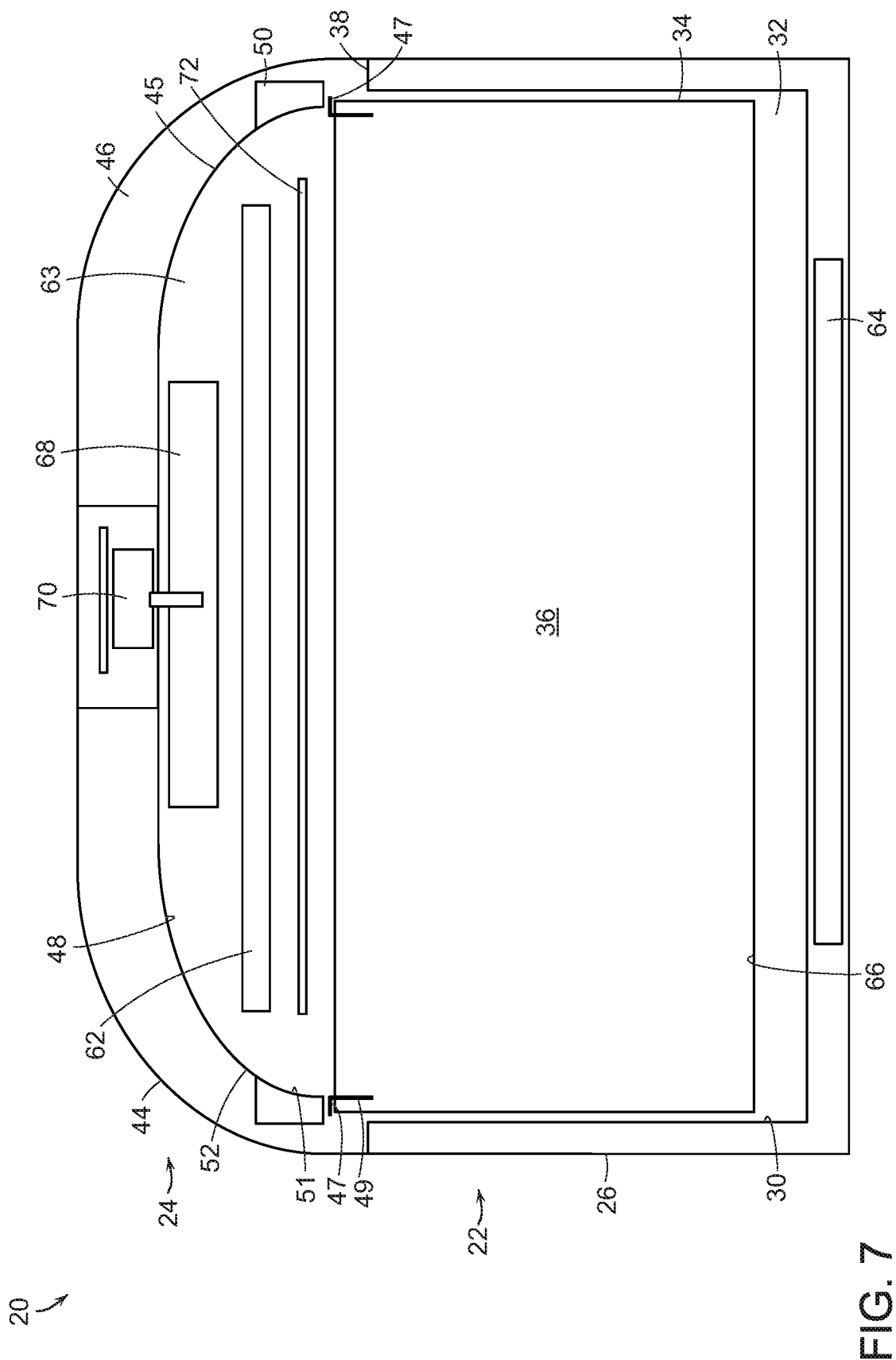

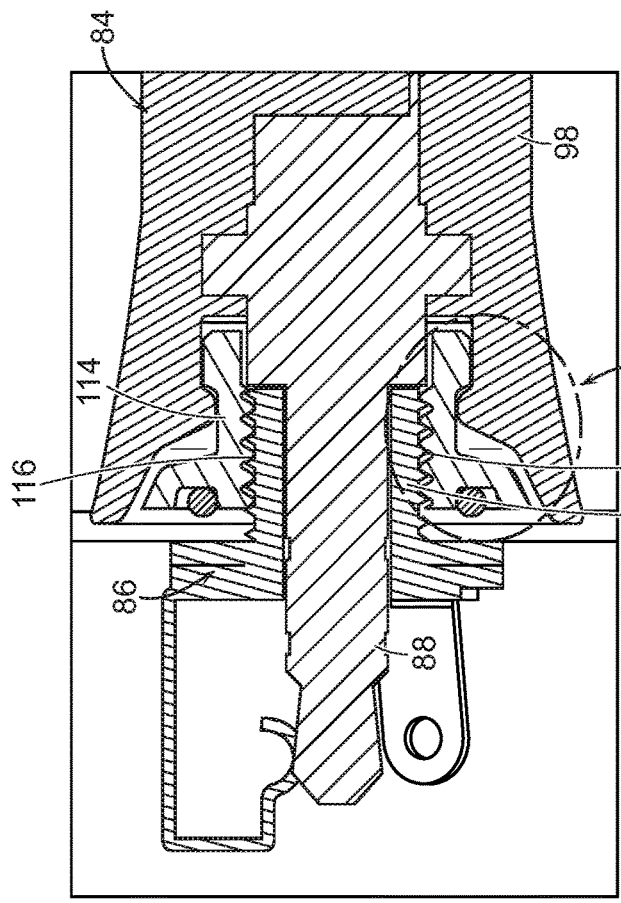
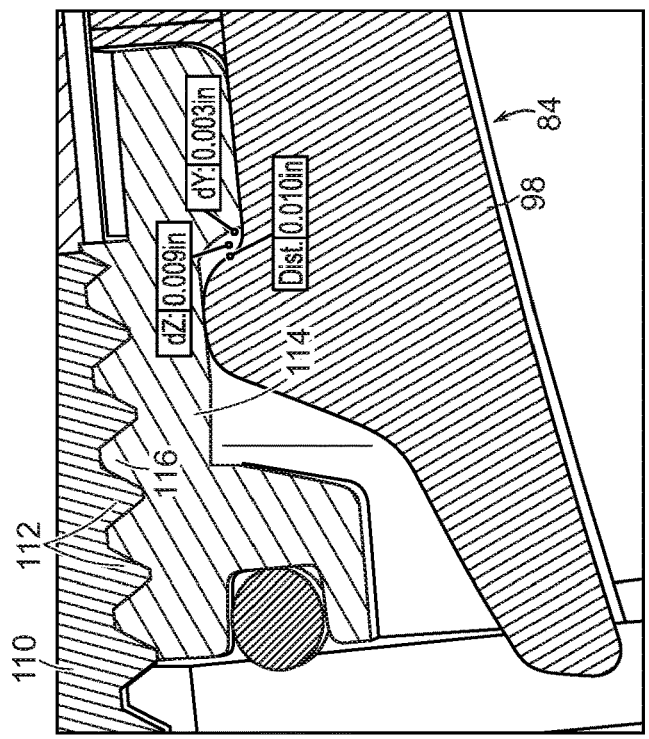
FIG. 12A
FIG. 12B

| Function | Default Time (HH:MM) | Time Settings | Pressure Settings | Default Temperature (F) | Temperature Settings | Fan Speed Settings (RPM) |
|---|---|---|---|---|---|---|
| Pressure | 0:10 HI (default) / 0:10 LO | 0:00-4:00, 1 min increments from 0:00-1:00, 5 min increments from 1:00-4:00 | LO: 50±10kPa HI: 80±10kPa | N/A | N/A | N/A |
| Slow Cook | 4:00 HI (default) / 8:00 LO | 4:00-12:00, 15 min increment HIGH 6:00-12:00, 15 min increment LOW | N/A | HI | LO / HI | N/A |
| Sear/Saute | N/A | No time functionality for sear/saute | N/A | HI | LO / LO:MD / MD / MD:HI / HI (include : where shown) | N/A |
| Steam | 0:10 | 0:01-0:30, 1 min increment | N/A | N/A | N/A | N/A |
| Air Crisp | 0:20 | 0:01-1:00, 1 min increment | N/A | 390 | 300, 315, 325, 330, 345, 350, 360, 375, 390, 400 | 100% Motor Power (target 2650RPM) |
| Roast | 0:15 | 0:01-4:00, 1 min increments from 0:01-1:00, 5 min increments from 2:00-4:00 | N/A | 375 | 250, 260, 275, 290, 300, 315, 325, 330, 345, 350, 360, 375, 390, 400 | 100% Motor Power (target 2650RPM) |
| Dehydrate | 6:00 | 1:00-12:00, 15 min increments | N/A | 150 | 105, 120, 135, 165, 180, 195 | 50% Motor Power (target 1200RPM) |
| Broil | 00:10 | 0:01-0:30, 1 min increments | N/A | 450 | 450 | 100% Motor Power (target 2650RPM) |

FIG. 17

COOKING DEVICE AND COMPONENTS THEREOF

FIELD

Embodiments of the present disclosure relates generally to a cooking device and components thereof, and more specifically, a multifunction device configured to perform the operation of a plurality of distinct cooking devices, the multifunctional cooking device optionally employing various components for cooking in the distinct cooking modes.

BACKGROUND

Conventional cooking devices, such as pressure cookers and air fryers each perform a single cooking operation, and as such, these devices employ different components and method for cooking food items. As such, multiple devices are required to perform various cooking operations. For consumers that wish to enjoy food cooked in different ways via different operations, an accumulation of these devices can occur. Such an accumulation of cooking devices is often prohibitive from a standpoint of cost and storage space. For at least these reasons, it would be desirable to integrate the functionality of several cooking devices into a single user-friendly cooking device.

SUMMARY

According to an embodiment, a cooking system for cooking food includes a housing defining a hollow chamber configured to receive the food, a lid movable relative to said housing between an open position and a closed position to form a pressure-tight cooking volume between said hollow chamber and said lid, at least one heating element associated with at least one of said housing and said lid, and a temperature probe positionable within said pressure-tight cooking volume. The cooking system is operable in a pressure cooking mode and during said pressure cooking mode. The temperature probe is operable to detect a temperature of the food in said pressure-tight cooking volume.

In addition to one or more of the features described above, or as an alternative, in further embodiments in said pressure cooking mode, a pressure of said cooking volume is at least 40 kPa.

In addition to one or more of the features described above, or as an alternative, in further embodiments in said pressure cooking mode, said pressure of said cooking volume is between 40 kPa and 100 kPa.

In addition to one or more of the features described above, or as an alternative, in further embodiments in said pressure cooking mode, said pressure of said cooking volume is at least 70 kPa.

In addition to one or more of the features described above, or as an alternative, in further embodiments in said pressure cooking mode, said pressure of said cooking volume is between 70 kPa and 100 kPa.

In addition to one or more of the features described above, or as an alternative, in further embodiments in said pressure cooking mode, said pressure of said cooking volume is at least 100 kPa.

In addition to one or more of the features described above, or as an alternative, in further embodiments said temperature probe is permanently affixed to one of said housing and said lid.

In addition to one or more of the features described above, or as an alternative, in further embodiments said temperature probe is removably connectable to one of said housing and said lid.

In addition to one or more of the features described above, or as an alternative, in further embodiments comprising: a first connector associated with said temperature probe and a second connector mounted to one of said housing and said lid, said first connector being removably connectable to said second connector.

In addition to one or more of the features described above, or as an alternative, in further embodiments said second connector is mounted to said lid.

In addition to one or more of the features described above, or as an alternative, in further embodiments said first connector is a male connector and said second connector is a female connector.

In addition to one or more of the features described above, or as an alternative, in further embodiments said first connector has a shaft and a first housing and said second connector has a second housing including a central opening, and both said shaft and said first housing being receivable within said central opening.

In addition to one or more of the features described above, or as an alternative, in further embodiments said first connector has a shaft and a first housing and said second connector has a second housing including a central opening, wherein said shaft is receivable within said central opening and said first housing is received about an outer periphery of said second housing.

In addition to one or more of the features described above, or as an alternative, in further embodiments a seal is formed at an interface between said first connector and said second connector.

In addition to one or more of the features described above, or as an alternative, in further embodiments pressure builds within said pressure-tight cooking volume during said pressure cooking mode assists with formation of said seal.

According to another embodiment, a temperature measurement system for measuring food temperature includes a temperature probe including a probe end insertable into the food and a data transmission end and a connector including a data receiving orifice. The data transmission end of said temperature probe is insertable into said data receiving orifice An interior of said connector is sealed from an environment surrounding said connector. When said data transmission end of said probe is inserted into said data receiving orifice a pressure tight seal is formed in said data receiving orifice.

In addition to one or more of the features described above, or as an alternative, in further embodiments said connector is an encapsulated socket.

In addition to one or more of the features described above, or as an alternative, in further embodiments the temperature measurement system is installed within a cooking system, the cooking system including: a housing defining a hollow chamber configured to receive food, a lid movable relative to said housing between an open position and a closed position to define a cooking volume between said hollow chamber and said lid, and at least one heating element associated with at least one of said housing and said lid.

In addition to one or more of the features described above, or as an alternative, in further embodiments said connector is located remotely from said cooking volume.

In addition to one or more of the features described above, or as an alternative, in further embodiments said connector is mounted within an interior of said lid.

In addition to one or more of the features described above, or as an alternative, in further embodiments a pressure within said interior of said connector is equal to a pressure of said cooking volume when said data transmission end of said temperature probe is not inserted within said data receiving orifice.

In addition to one or more of the features described above, or as an alternative, in further embodiments a pressure within said interior of said connector is equal to a pressure of said cooking volume when said data transmission end of said temperature probe is inserted within said data receiving orifice.

In addition to one or more of the features described above, or as an alternative, in further embodiments said data transmission end is insertable into said data receiving orifice to seal said interior of said socket from said cooking volume.

In addition to one or more of the features described above, or as an alternative, in further embodiments said temperature probe is operable during a pressure cooking mode of the cooking system.

In addition to one or more of the features described above, or as an alternative, in further embodiments in said pressure cooking mode, a pressure of said cooking volume is at least 40 kPa.

BRIEF DESCRIPTION OF THE FIGURES

The accompanying drawings incorporated in and forming a part of the specification embodies several aspects of the present disclosure and, together with the description, serves to explain the principles of the disclosure. In the drawings:

FIG. 7 is a schematic diagram of a cooking system according to an embodiment;

FIG. 12A is a cross-sectional view of a first connector and a second connector of the temperature measurement system of FIG. 11 according to an embodiment;

FIG. 12B is a detailed view of a portion of FIG. 12A according to an embodiment;

FIG. 17 is a table showing cooking parameters for use in a cooking system according to an embodiment.

The detailed description explains embodiments of the disclosure, together with advantages and features, by way of example with reference to the drawings.

DETAILED DESCRIPTION

Figure 1:
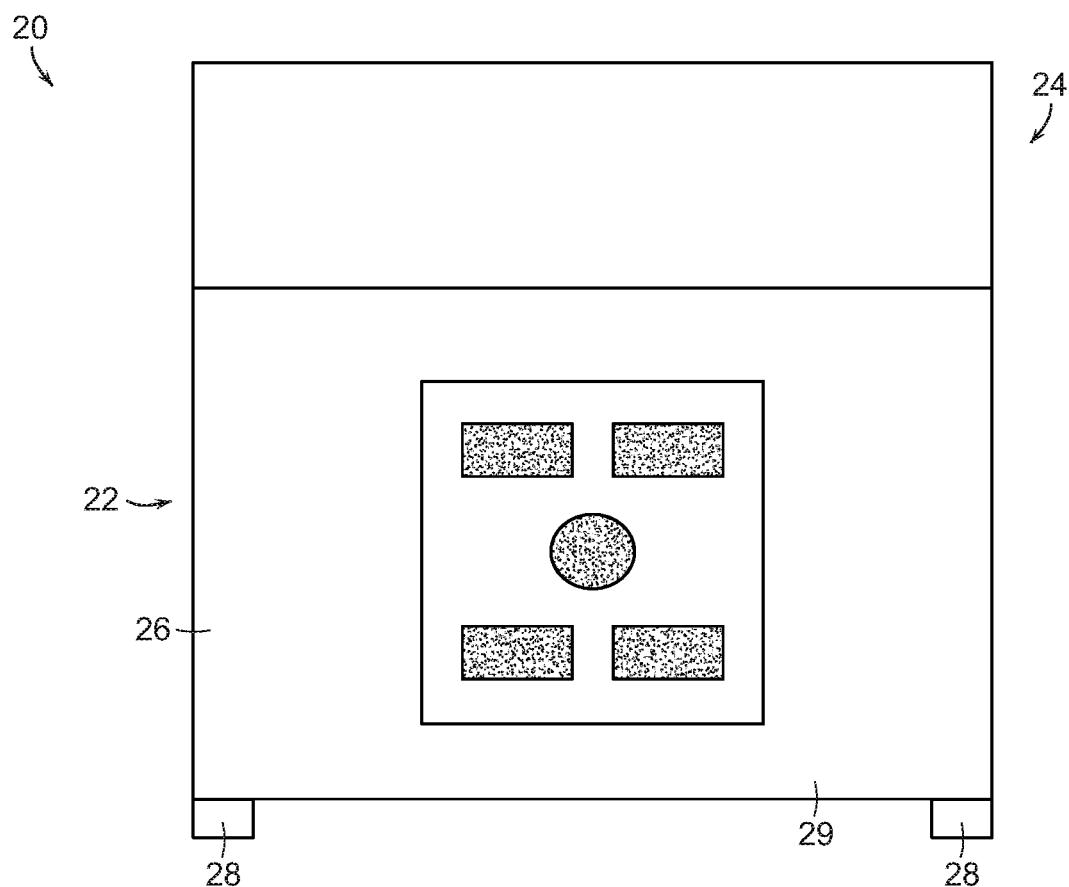
FIG. 1 is a perspective view of a cooking system according to an embodiment.
Figure 2:
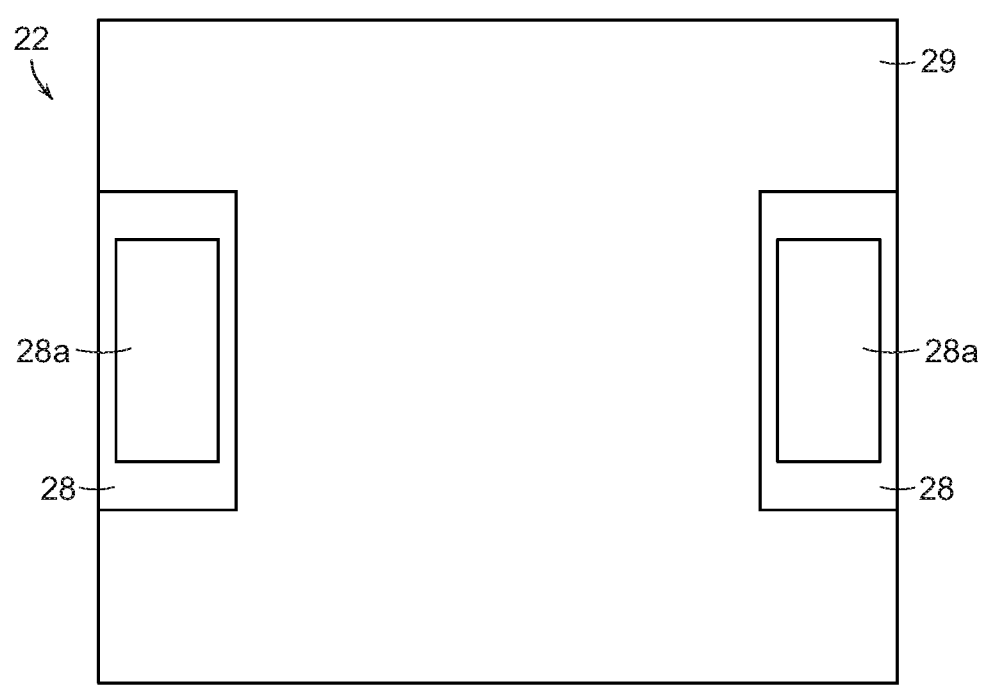
FIG. 2 is a bottom view of a cooking system according to an embodiment.
Figure 3:
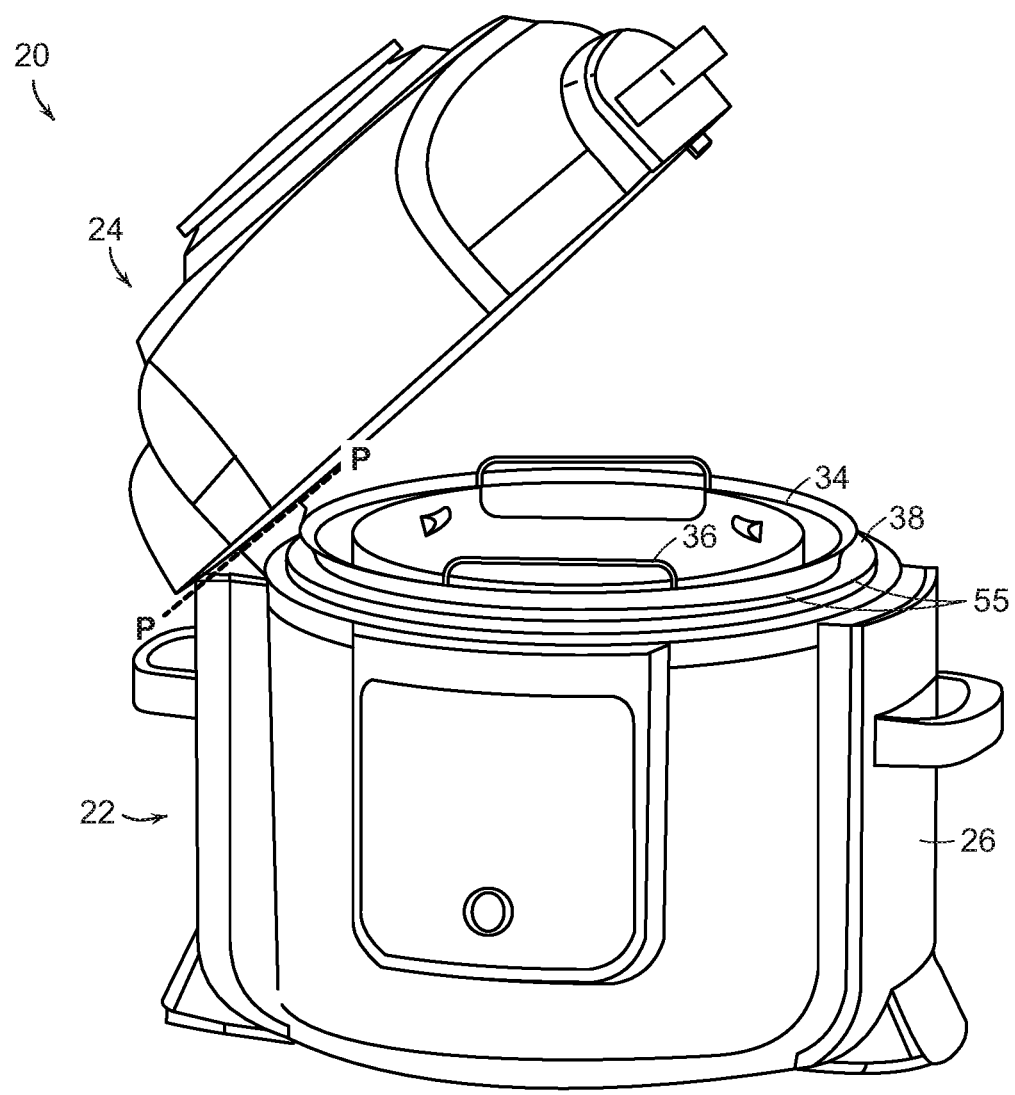
FIG. 3 is a perspective view of a cooking system having an open lid according to an embodiment.

With reference now to FIGS. 1-3, an example of the cooking system 20 is illustrated. As shown, the cooking system 20 includes a base 22 and a lid 24 permanently or removable attached to the base 22. The base 22 includes a housing 26 made of any suitable material, such as glass, aluminum, plastic, or stainless steel for example. A bottom of the housing 26 of the cooking system 20 (see FIG. 1B) may be supported on a surface by one or more feet 28, which may include shock absorbing pads 28a (of a material such as but not limited to rubber) at a bottom surface thereof. The feet 28 may extend from the housing 26 to define a surface on which the cooking system 20 may contact an adjacent supporting surface, such as a countertop for example. The bottom surface of the feet 28 or pads 28a may be flush with, or alternatively, may extend out of plane from the bottom surface 29 of the housing 26. In the illustrated, non-limiting embodiment, the housing 26 includes two feet 28 arranged on opposing sides of the housing 26; however, it should be understood that a housing having any suitable number of feet 28 is within the scope of the disclosure.

A liner 30 may be disposed within the hollow interior 32 of the housing 26. The liner 30 may be formed from any suitable conductive material, such as aluminum for example. In an embodiment, the liner 30 forms an interior surface of the housing 26 and thereby defines the hollow interior 32 of the housing 26. Alternatively, the liner 30 may be offset from the interior surface of the housing 26. However, it should be understood that other components of the cooking system 20, or surfaces thereof, may also define the hollow interior 32.

A cooking container 34 is receivable within the hollow interior 32 of the housing 26. Although the cooking container 34 is described herein as being removable from the housing 26 of the base 22, embodiments where the cooking container 34 is integrally formed with the housing 26 are also contemplated herein. Spacing components, such as silicone bumpers (not shown) may be disposed along the inner surface of the liner 30 to keep the cooking container 34 aligned properly within the hollow interior 32 during cooking.

The cooking container 34 has an interior 36 designed to receive and retain one or more consumable products, such as food products for example, therein. Examples of food products suitable for use with the cooking system 20, include but are not limited to, meats, fish, poultry, bread, rice, grains, pasta, vegetables, fruits, and dairy products, among others. The cooking container 34 may be a pot formed from a ceramic, metal, or die cast aluminum material. In an embodiment, an interior surface of the cooking container 34 includes a nano-ceramic coating and an exterior surface of the cooking container 34 includes a silicone epoxy material. However, any suitable material capable of withstanding the high temperatures required for cooking food products is contemplated herein. Further, one or more handles may be associated with the cooking container 34 to allow a user to easily grasp and manipulate the cooking container 34 relative to the housing 26.

One or more accessories, may be compatible for use with the cooking system 20. Examples of such accessories include, but are not limited to, a diffuser, a crisping insert, grill plate, and a griddle for example. In such embodiments, the accessories may be receivable within the hollow interior 32 of the housing 26, or alternatively, within the interior 36 of the cooking container 34.

Referring with more detail to the lid 24, it should be noted that the lid 24 is connectable to a surface of the cooking container 34 and/or housing 26 to close off entry to the interior 36 of the cooking container 34. Accordingly, a cooking volume may be defined between the interior 36 of the cooking container 34 and the closed lid 24, such as the bottom surface of the closed lid, or alternatively, between the hollow interior 32 defined by the housing 26 and the closed lid 24. In an embodiment, a diameter of the lid 24 is generally complementary to a diameter of the housing 26 such that the lid 24 covers not only the cooking container 34, but also an upper surface 38 of the housing 26.

The lid 24 is movable relative to the base 22 between an open position, in which the cooking container 34 is accessible, and a closed position to selectively cover the hollow interior 32 and interior 36. The lid 24 may be distinct and separable from the base 22, or alternatively, the lid 24 may be movably connected to the base 22. In the illustrated, non-limiting embodiment of FIG. 1, the lid 24 is pivotable or rotatable relative to the base 22 via a hinge, such that the lid is rotatable about a pivot axis P. However, other types or movement of the lid 24 are also within the scope of the disclosure.

One or more fastening mechanisms (not shown) may but need not be used to secure the lid 24 or a portion thereof to the base 22 when the lid 24 is in the closed position. In an embodiment, the fastening mechanism is selectively engaged when the lid 24 is in the closed position, or alternatively in some embodiments based on a selected cooking operation, such as pressure cooking for example, of the system 20. Any suitable type of fastening mechanism capable of withstanding the heat and pressure associated with the cooking system 20 is considered within the scope of the disclosure.

Figure 4:
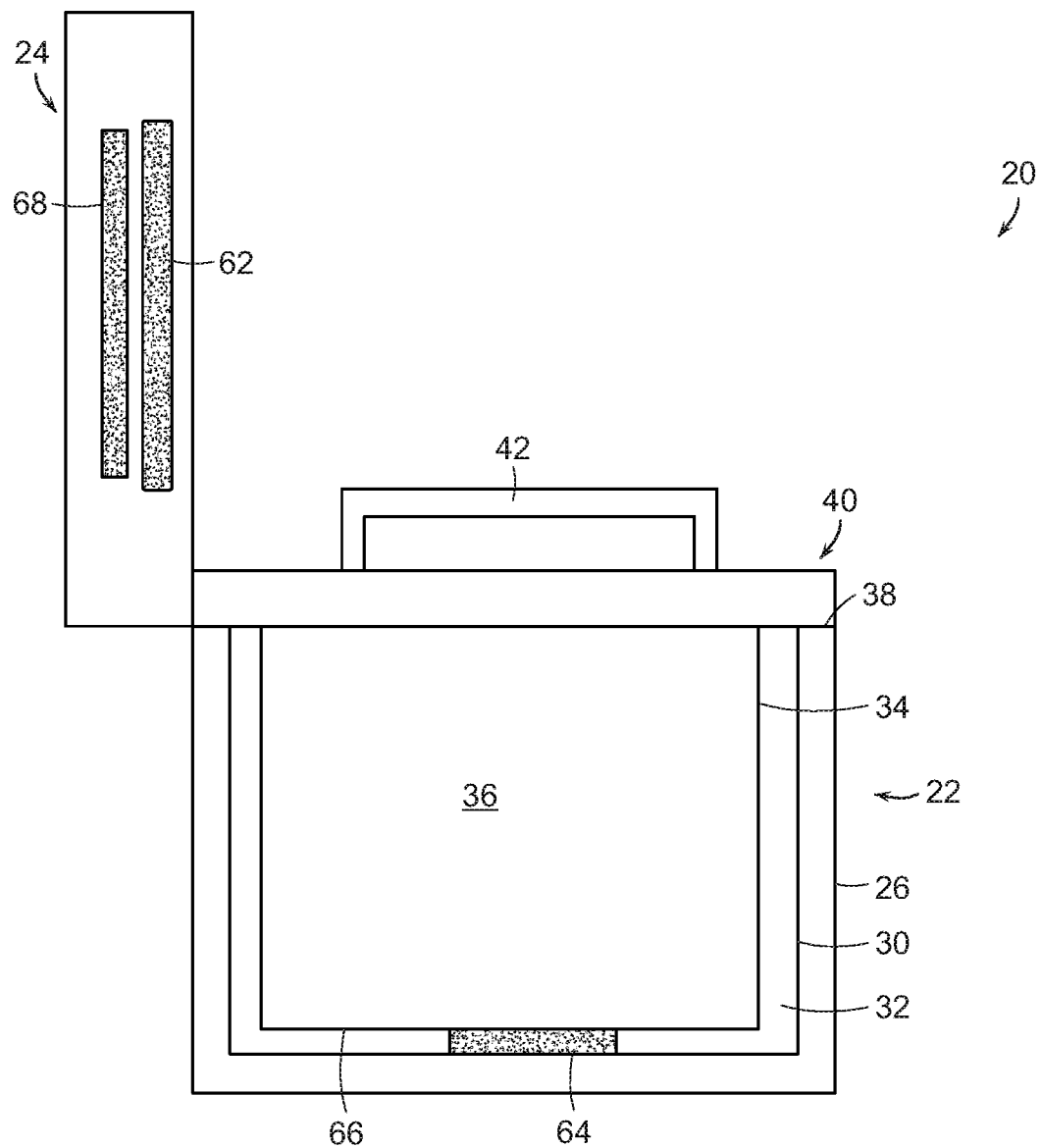
FIG. 4 is a schematic cross-sectional view of a cooking system having a first lid and a second lid according to an embodiment.
Figure 5:
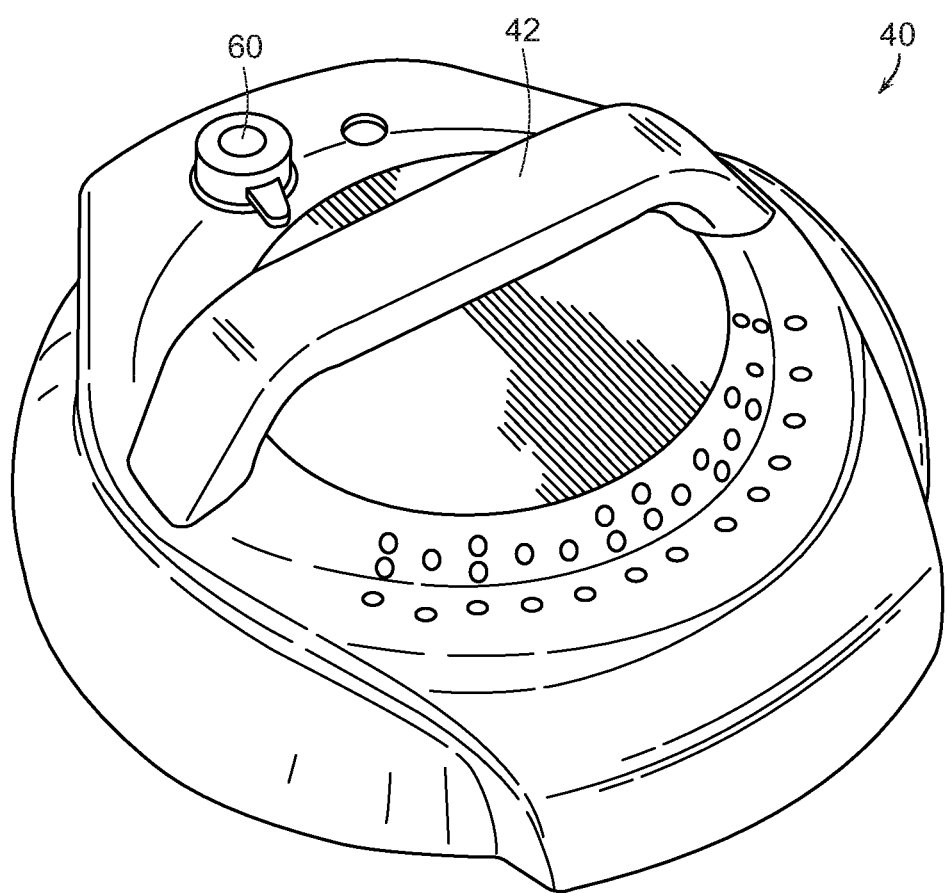
FIG. 5 is a perspective view of a pressure lid of a cooking system according to an embodiment.

In the non-limiting embodiment of FIGS. 4 and 5, the cooking system 20 additionally includes a secondary lid 40 configured to removably couple to the housing 26 and/or cooking container 34 to seal the hollow interior 32. The secondary lid 40 may be press-fit onto an upper surface 38 of the housing 26 or directly to the cooking container 34, or alternatively, may be configured to threadably couple to the upper surface 38 of the housing 26 or the cooking container 34. However, it should be understood that embodiments where the secondary lid 40 is configured to couple to at least one of the housing 26 and cooking container 34 in another suitable manner, such as via a pressure tight mechanism for example, are also contemplated herein.

The secondary lid 40 can be made of any suitable material, such as glass, aluminum, plastic, or stainless steel, or any combination thereof for example. In an embodiment, the secondary lid 40 is formed from a stamped stainless steel material and may have a decorative plastic exterior. In addition, the secondary lid 40 may, but need not, include one or more handles, such as handle 42 for removably coupling the secondary lid 40 to the cooking system 20. The handle 42 may be integrally formed with the secondary lid 40, such as via a molding process, or may be a separate component coupled to the secondary lid 40.

It should be noted that in an exemplary embodiment the secondary lid 40 is a pressure lid. That is, the secondary lid 40 is connectable to the housing 26 in a manner that creates a pressure tight seal with an upper portion of the cooking container 34. This seal can be achieved by locking or fastening the lid to the housing 26, while a component of the secondary lid 40, such as a flexible/resilient gasket, forms the pressure tight seal with the upper portion of the cooking container 34. This gasket may be made of rubber, silicone, or other similar materials.

By affixing the secondary lid 40 to the housing 26 and cooking container 34, a pressure-tight cooking volume may be defined between the interior 36 of the cooking container 34 and the closed secondary lid 40. Within this volume, a high pressure cooking environment is achievable, with pressure levels reaching at least 40 kPa, and in some instances at least 70 kPa. Pressure ranges between 40 kPa and 100 kPa, as well as between 70 kPa and 100 kPa are contemplated, and may reach a threshold of 100 kPa, 200 kPa, 300 kPa, 400 kPa, 500 kPa, or even greater.

To couple the secondary lid 40 to the housing 26, the lid 24 must be in an open position (see FIG. 4). Further, in an embodiment, the lid 24 is not movable to the closed position relative to the housing 26 when the secondary lid 40 is affixed thereto. This may be due to the outer diameter of the secondary lid 40, or alternatively, because one or more components extending upwardly from the secondary lid 40, such as handle 42, would interfere with a portion of the lid 24. However, in other embodiments, at least a portion of the secondary lid 40 may be nestable or receivable within the lid 24. In such embodiments, the outer diameter of the secondary lid 40 may be smaller than the inner diameter of the lid 24, such that the lid 24 substantially surrounds the secondary lid 40 when in the closed position. Accordingly, the enclosure defined by the hollow interior 36 of the cooking container 34 and the secondary lid 40 is smaller than the enclosure formed by the hollow interior 36 of the cooking container 34 and the lid 24.

Figure 6:
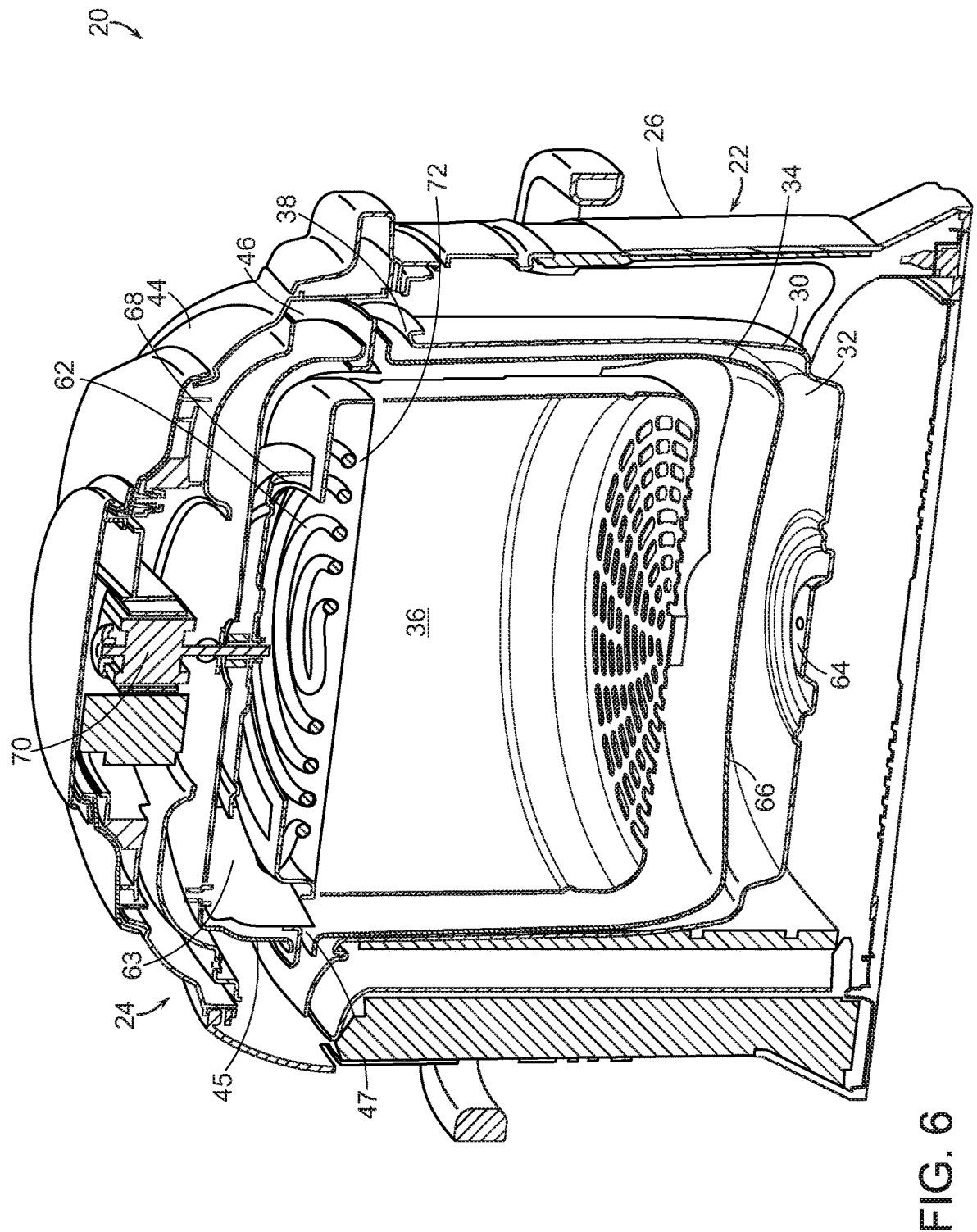
FIG. 6 is a detailed cross-sectional view of an interior of a cooking system according to an embodiment.

With reference now to FIGS. 6 and 7, in another embodiment, the lid 24 is the only lid connectable to the housing 26 and/or the cooking container 34 during all modes of operation of the cooking system 20. In the illustrated, non-limiting embodiment, the lid includes a generally convex outer lid or lid housing 44 made from any suitable material. In some embodiments, at least a portion of the material of the lid housing 44 may be substantially identical to the material of the housing 26. An inner lid liner (or sealing liner) 45 is arranged within the hollow interior 46 of the lid housing 44. Although the inner lid liner 45 is illustrated as also having a generally convex shape, embodiments where the shape of the inner lid liner 45 is different than the shape of the lid housing 44 are also within the scope of the disclosure. Further, the inner lid liner 45 can be made of any suitable material, such as glass, aluminum, plastic, or stainless steel, or any combination thereof for example. The inner lid liner 45 may but need not be made from the same material as the lid housing 44.

In an embodiment, a sealing surface 47 of the lid 24 is connectable to the upper surface 38 of the housing 26 or directly to the cooking container 34 to form a pressure-tight seal between the lid 24 and the cooking container 34 or housing 26. As a result, an interior surface 48 of the inner lid liner 45 defines a relatively upper boundary of a heating volume through which a fluid can circulate. In an embodiment, the sealing surface 47 is arranged at the end of the inner lid liner 45 adjacent to the cooking container 34. The sealing surface 47 may be formed by a portion of the inner lid liner 45 itself, or as best shown in the FIG. 7, a flexible/resilient gasket 49 connected to a portion of the inner lid liner 45, such as the end thereof, may define the sealing surface 47. This gasket 49 may be made of rubber, silicone, or other similar materials, and may include a flange that is received within an interior of the cooking container 34. It should be appreciated that the pressure tight seal formed between the lid 24 and the cooking container 34 or housing 26 may occur during all cooking modes, or just select cooking modes such as those modes that involve pressure or conductive cooking. In embodiments wherein the pressure tight seal is just formed in select cooking modes, this seal may not be formed in air fry or convection modes, and the lid 24 may simply rest on the upper surface 38 of the housing or the cooking container 34 when the lid 24 is closed.

Figure 7A:
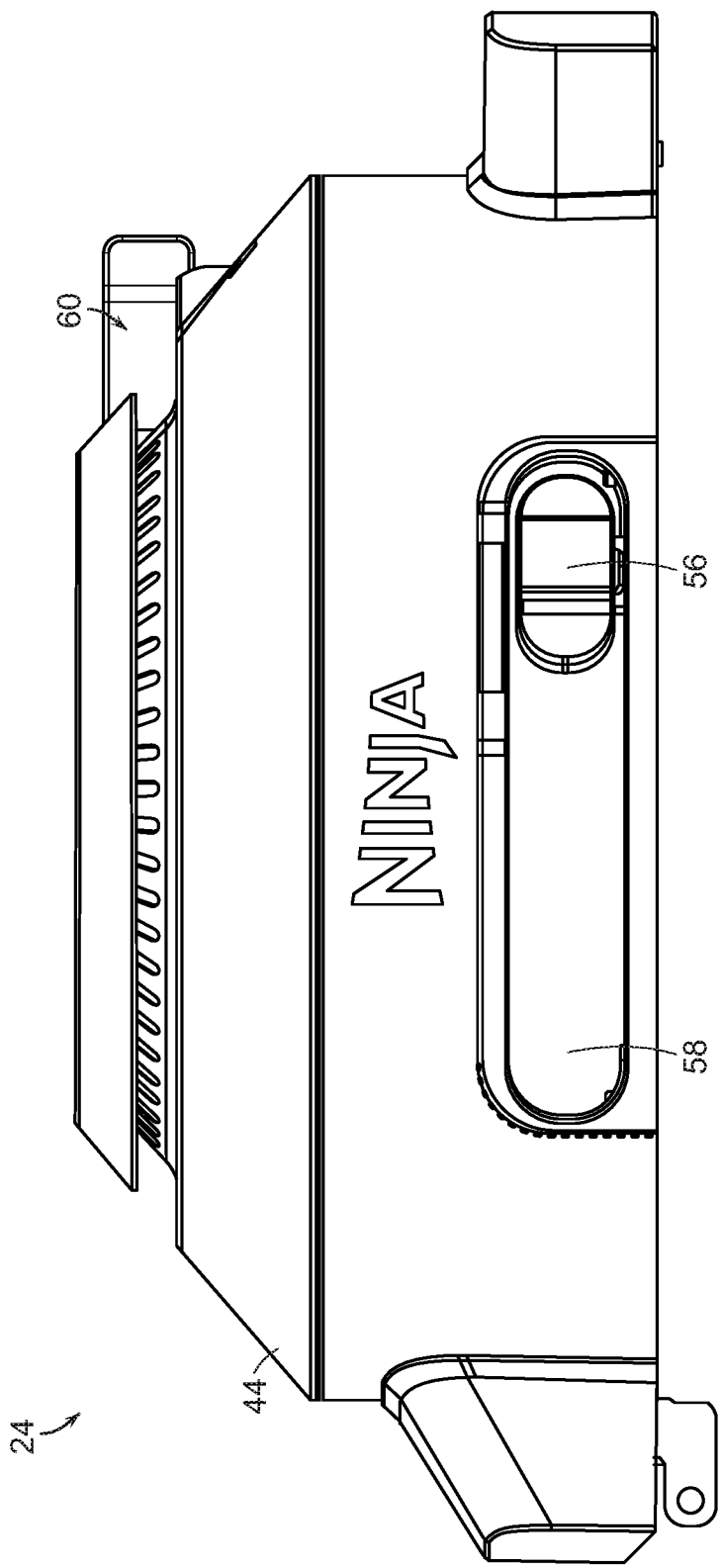
FIG. 7A is a front view of the lid of the cooking system of FIG. 7 according to an embodiment.
Figure 8:
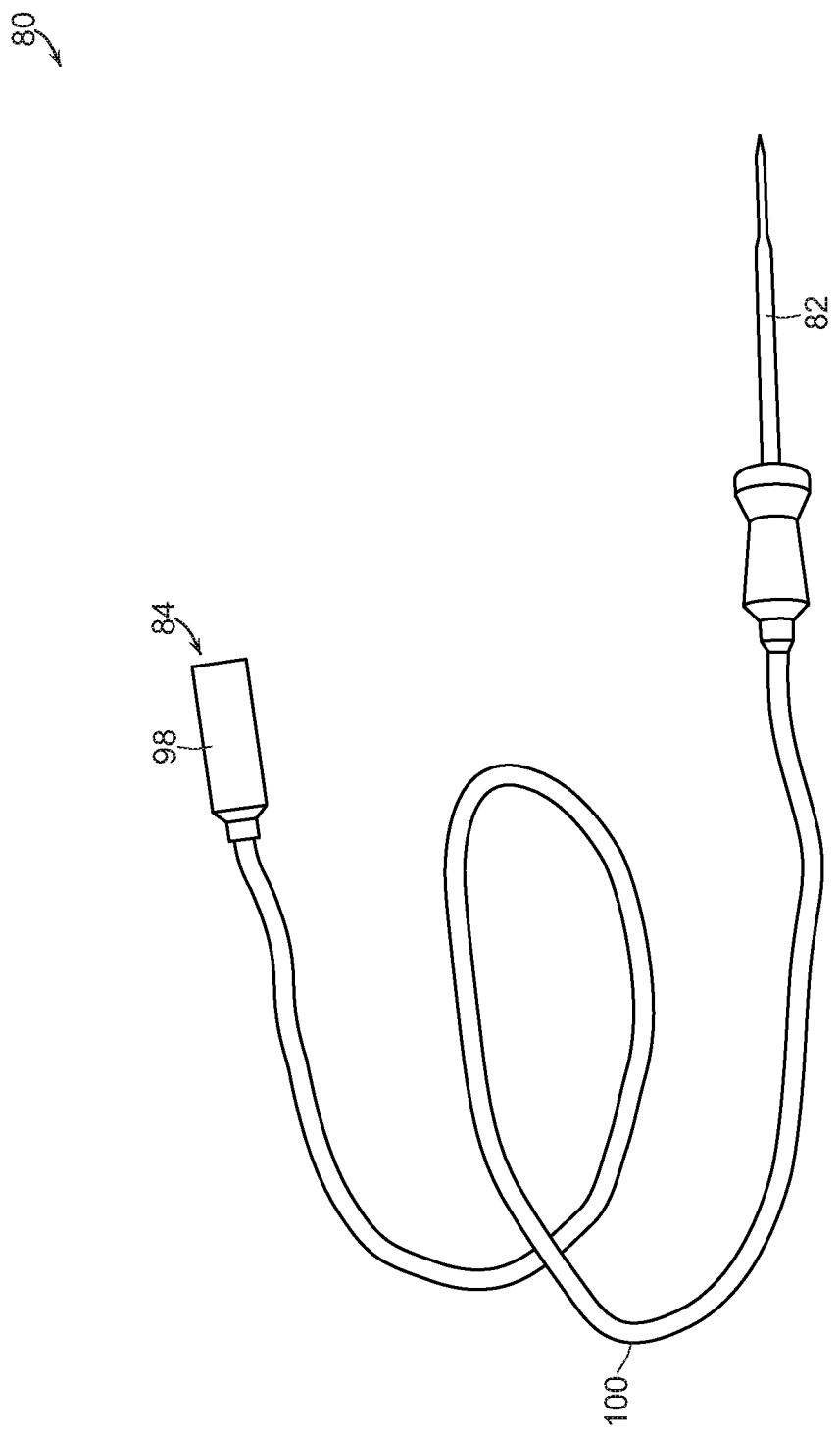
FIG. 8 is a perspective view of a portion of a temperature measurement system of a cooking system according to an embodiment.

The system 20 may also include embodiments wherein additional steps beyond simply closing the lid 24 may have to be taken in order to form the pressure tight seal. In other words, closing the lid 24 relative to the base 22 may not automatically form a pressure-tight seal there between. In such an exemplary embodiment, the lid 24 additionally includes a lid lock 50. As best shown in FIGS. 7 and 7A, the lid lock 50 is arranged within the interior of the lid housing 44, such as generally concentrically with a portion of the inner lid liner 45 relative to a central axis of the lid 24. In the illustrated, non-limiting embodiment, the lid lock 50 has a ring shaped or annular body aligned with a bottom surface of the lid housing 44 and/or the inner lid liner 45. An inner surface 51 of the lid lock 50 may be positioned generally adjacent to or in directly contact with an exterior surface 52 of the inner lid liner 45. In an embodiment, the lid lock 50 is movable, such as rotatable about an axis relative to the lid housing 44 and the inner lid liner 45, to selectively apply a pressure to move the sealing surface 47 into engagement with the cooking container 34 to form a pressure-tight seal therebetween. However, in other embodiments, it should be understood that closing the lid 24 relative to the base 22 may form a pressure-tight press-fit connection between the sealing surface 47 and/or the cooking container 34.

Figure 9:
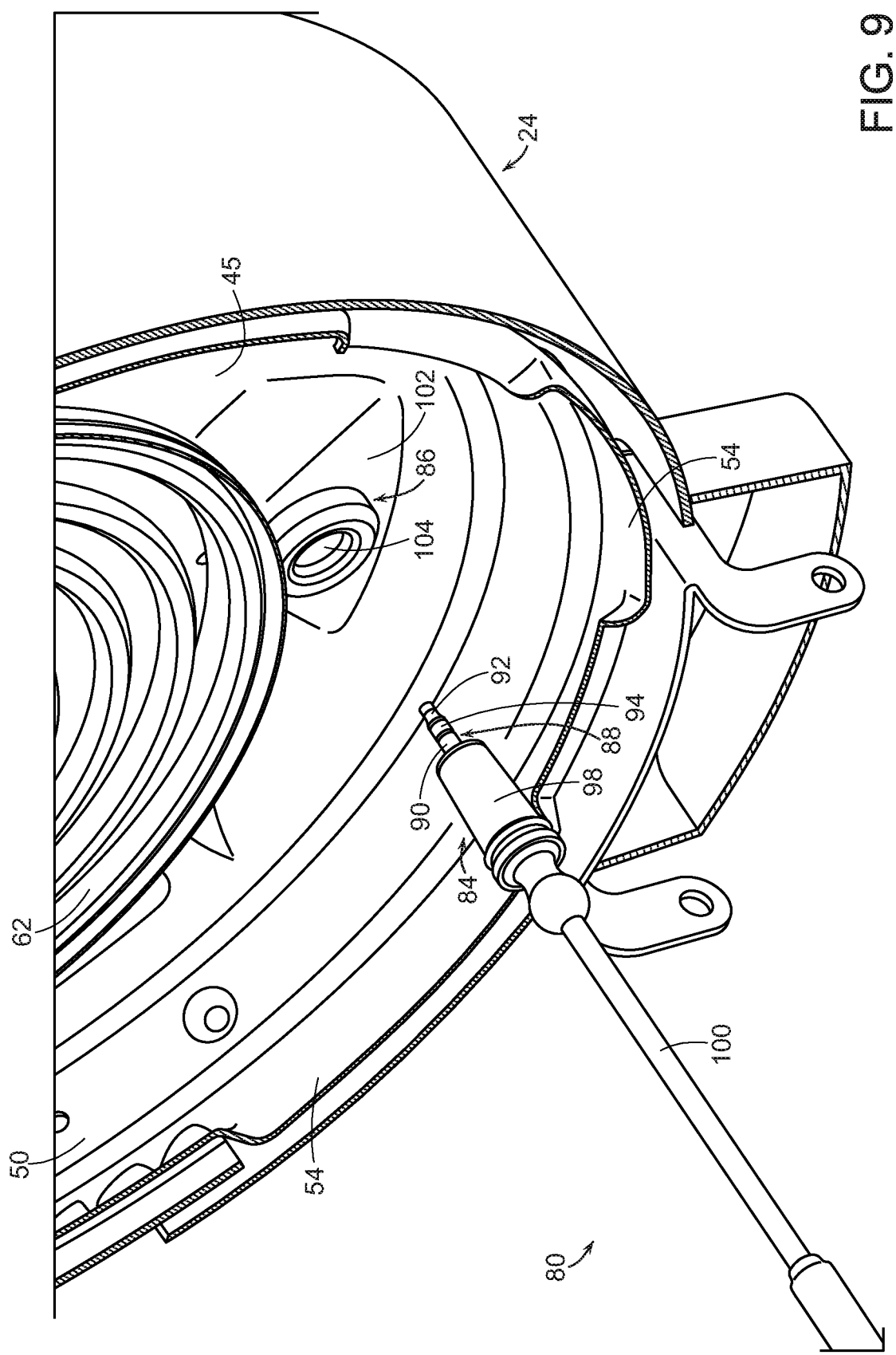
FIG. 9 is a perspective view of a portion of a temperature measurement system and a lid of the cooking system according to an embodiment.
Figure 10A:
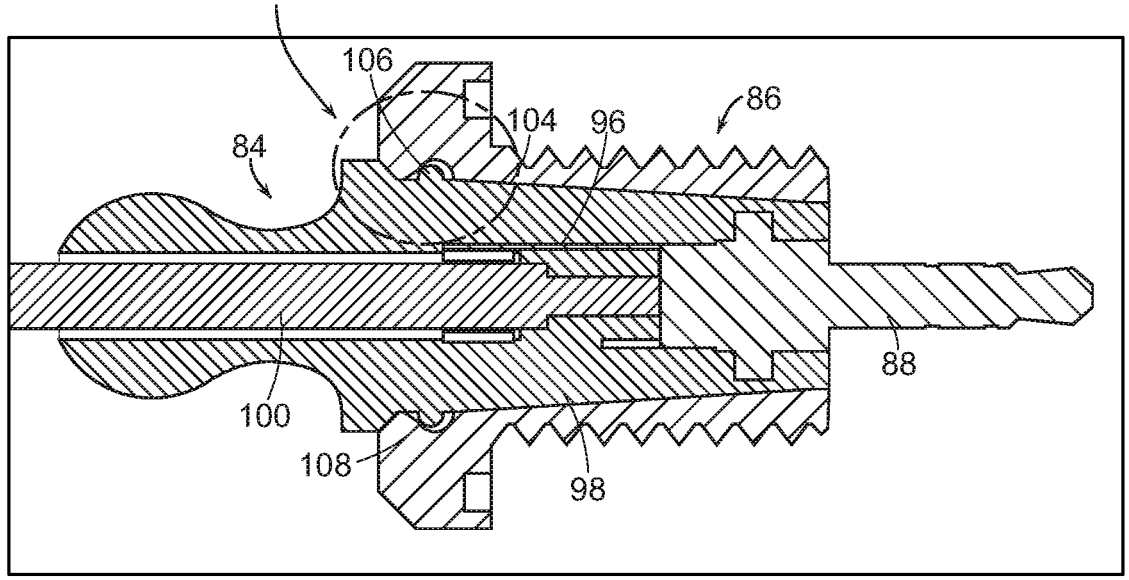
FIG. 10A is a cross-sectional view of a first connector and a second connector of the temperature measurement system of FIG. 9 according to an embodiment.
Figure 10B:
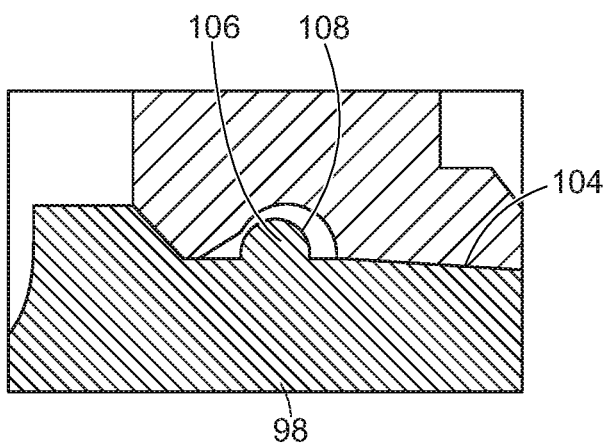
FIG. 10B is a detailed view of a portion of FIG. 10A according to an embodiment.

Regardless of whether rotation of the lid lock 50 is required to form a pressure-tight seal, the lid lock 50 is operable as a locking mechanism that retains or locks the lid 24 in the closed position relative to the base 22. For example, the lid lock 50 may include a first portion of a bayonet locking system such that by rotating the lid lock 50, one or more engagement members 54 (see FIG. 9) formed on the lid lock 50 abut or intermesh with one or more engagement members 55 (FIG. 3) of a complementary second portion of the bayonet locking system extending from an upper portion of the housing 26 to restrict movement of the sealing surface 47 away from the cooking container 34 in response to an increased pressure within the heating volume. In other embodiments where a pressure-tight seal is formed upon closing the lid 24 relative to the base 22, another locking mechanism, distinct from the lid lock 50 may be operable to maintain the sealing surface 47 in sealing engagement with the cooking container 34 once a pressurized environment is generated.

At least a portion of or a part connected to and extending from the lid lock 50 may be accessible at an exterior surface of the cooking system 20 for manipulation by a user to selectively lock the lid 24 to the base 22 so as to form and/or maintain a pressure-tight heating volume defined between the interior surface 48 of the inner lid liner 45 and the cooking chamber of the cooking container 34 (to be described in more detail below). In the illustrated, non-limiting embodiment, best shown in FIG. 7A, the lid lock 50 includes an outwardly extending protrusion 56, also referred to herein as a mode selector, arranged within an opening 58, for example a slot, formed at an exterior surface of the lid housing 44, In such embodiments, a user may transform the lid lock 50 between locked and unlocked configurations by translating the mode selector 56 within the opening 58 between a first position and a second position. Although the inner lid liner 45 is described herein as being stationary and the lid lock 50 is described as being movable relative to the inner lid liner 45, embodiments where the inner lid liner 45 is coupled to or is formed as a unitary body with the lid lock 50, such that both the inner lid liner 45 and the lid lock 50 are movable relative to the lid housing 44 in unison are also within the scope of the disclosure.

The lid 24, or the secondary lid 40 in embodiments including a distinct lid for a pressure cooking application, may additionally include a pressure relief mechanism 60, such as a vent or valve. The pressure relief mechanism 60 may be configured to automatically open to release air from within the heating volume formed between the interior 48 of the inner lid liner 45 and the cooking container 34 or between the secondary lid 40 and the cooking container 34 when the pressure therein exceeds a predetermined threshold, such as during operation of the cooking system in a first cooking mode performing a pressure cooking operation. Alternatively, or in addition, the pressure relief mechanism 60 is manually operable, such as rotatable about a vertically oriented axis for example, to release air from within the chamber. In a closed position, the pressure relief mechanism 60 prevents steam (or air and/or other fluids) from leaving the interior 36 of the cooking container 34. In an open position, the pressure relief mechanism 60 allows steam (or air and/or other fluids) to exit the interior 36 of the cooking container 34.

The cooking system 20 includes at least one heating element operable to impart heat to the cooking volume during one or more of a plurality of cooking modes of the cooking system 20. In the illustrated, non-limiting embodiment, a first heating element 62 is positioned generally at or above an upper extent of the cooking container 34, such as proximate a center of the interior 36 of the cooking container 34 for example. As shown, the at least one first heating element 62 is mounted within the lid 24, and therefore completely outside of the cooking container 34, and vertically offset from the upper extent thereof. In embodiments where the lid 44 has an inner lid liner 45, the first heating element 62 is arranged within the interior 63 of the inner lid liner 45. Alternatively, or in addition, a second heating element 64 may be disposed within the housing 26, generally adjacent the bottom 66 of the cooking container 34. However, it should be understood that embodiments where a heating element is arranged at another location within the base 22 and/or the lid 24 are also contemplated herein.

The at least one first and second heating element 62, 64 may be capable of performing any suitable type of heat generation. For example, a first and second heating element 62, 64 configured to heat the cooking container 34 or one or more food items located within the interior 36 of the cooking container 34 via conduction, convection, radiation, and induction are all within the scope of the disclosure. In the illustrated, non-limiting embodiment, the first heating element 62 is operable to cook food within the cooking container 34 via a non-contact cooking operation. As used herein, the term "non-contact cooking operation" includes any cooking operation where a heating element or heat source is not arranged in direct or indirect contact with a food item, such as, but not limited to, convective and radiant heating. In such embodiments, the cooking system 20 additionally includes an air movement device, such as a fan 68 for example, operable to circulate air within the cooking volume. The air is heated as it flows along its path of circulation, such as by flowing over a portion of the at least one first heating element 62. In the illustrated, non-limiting embodiment, the fan 68 is arranged within the interior 63 of the lid 24, downstream from the first heating element 62 relative to the path of circulation of the air. The fan 68 is driven by a motor 70 having a separate cooling mechanism coupled thereto.

In an embodiment, the second heating element 64 is operable to cook food within the cooking container 34 via a contact cooking operation. As used herein, the term "contact cooking operation" includes a cooking operation where heat is transmitted via direct or indirect contact between a heating element or heat source and a food item, such as, but not limited to, conductive and inductive cooking. However, it should be understood that embodiments where the first heating element 62 is operable to perform a contact cooking operation and embodiments where the second heating element 64 is operable to perform a non-contact cooking operation are also within the scope of the disclosure.

Further, in embodiments including first heating element 62 and second heating element 64, it should be understood that the first and second heating elements 62, 64 may be operable independently or in combination to apply one or more predetermined power settings to cook the food products within the cooking container. In operation, the first and second heating elements 62, 64 may be capable of cooking the food independent of the loading of the food. In other words, the first and second heating elements 62, 64 may be capable of cooking the food independent of the amount of food within the cooking container 34. The cooking operations that may be performed by the cooking system 20 include but are not limited to pressure cooking, steam cooking, slow cooking, searing, sautéing air frying, broiling, baking/roasting, dehydrating, and grilling. Parameters associated with the various described, non-limiting cooking modes are shown at FIG. 17.

With reference to FIGS. 6 and 7, the lid 24 may include a fan cover 72 that protects a user from the first heating element 62 and fan 68 and protects the first heating element 62 and fan 68 from the areas of the cooking system 20 where food is cooked. In the illustrated non-limiting embodiment, the cover 72 is mounted within the lid 24, such as adjacent, and more specifically upstream from, the first heating element 62 relative to an air flow. The cover 72 generally includes a body having formed from any suitable heat-resistant material. The body of the cover 72 has a plurality of openings (not shown) formed therein to allow hot air circulating within the chamber of the cooking container 34 to pass there through. In the illustrated, non-limiting embodiment, the cover 72 has a nano-ceramic coating and is mounted via any suitable mounting mechanism, such as via one or more fasteners for example, and may be removably or permanently arranged therein. The cover 72 may be sized to substantially overlap, and therefore protect, the entire surface of the first heating element 62 facing the cooking volume. In an embodiment, a contour of the cover 72 is generally complementary to the shape of the first heating element 62 to protect the surface of the first heating element 62 closest to the cooking volume. However, in other embodiments, the contour of the cover 72 may be complementary to the interior of the lid 24. Accordingly, when the lid 24 is in the closed position, the cover 72 is arranged generally above the first open end of the cooking container 34.

With reference now to FIGS. 8-16, the cooking system 20 may additionally include a temperature measurement system 80 for monitoring a temperature within the cooking chamber during a cooking operation, such as during a pressure cooking operation for example. In an embodiment, the temperature measurement system 80 is used to measure the environment within the cooking chamber. Alternatively, the temperature measurement system 80 may be used to measure the temperature of a food item or a liquid within the cooking chamber. In an embodiment, best shown in FIG. 8, the temperature measurement system 80 includes a positionable temperature probe 82. A temperature probe 82 including any suitable type of temperature sensor (not shown), such as a thermometer, a thermistor, a thermocouple, or a resistance temperature detector for example, is within the scope of the disclosure. In such embodiments, the temperature sensor may be configured to measure a change in voltage which is then converted to a temperature. However, a temperature sensor operable to measure another parameter within the cooking chamber is also contemplated herein. Further, although the probe 82 is illustrated and described herein for use during a pressure cooking operation, it should be understood that embodiments where the probe 82 is also suitable for use in another cooking mode, such as during an air frying cooking operation for example, are also within the scope of the disclosure.

In an embodiment, the temperature probe 82 is removably connectable to a portion of the cooking system 20, such as the lid 24 or the secondary lid 40 for example. In such embodiments, the temperature measurement system 80 includes a first connector 84, such as a male connector, associated with the temperature probe 82, and a second connector 86, such as a female connector, mounted to the cooking system 20 and configured to couple to the first connector 84. However, in other embodiments, at least a portion of the temperature measurement system 80, such as the temperature probe 82 for example, may be permanently affixed to cooking system 20 at a fixed point, such as located at the lid 40 or the lid housing 44 or inner lid liner 45 for example. When a portion of the temperature measurement system 80 is affixed to the system 20 at the fixed point, the temperature probe 82 may be movable relative to the fixed point, such as via a cable 100 extending between the temperature probe 82 and the fixed point. In such embodiments, the permanent connection between the cable and the fixed point may be used in place of the first and second connectors 84, 8 526.

In the illustrated, non-limiting embodiment of FIGS. 9-16B, the first connector 84, which defines a data transmission end opposite the probe end of the temperature probe 82, includes a shaft 88 divided into a plurality of sections, such as including a sleeve 90 and a tip 92. In some embodiments, the shaft 88 additionally includes at least one ring 94 disposed between the sleeve 90 and the tip 92. Further, the first connector 84 may include one or more contactors 96 (see FIG. 10A) corresponding to each of the sleeve 90, tip 92, and at least one ring 94 of the shaft 88. The first connector 84 additionally includes a housing 98 within which a portion of the shaft 88 is located. This housing 98 is typically formed from an insulating, non-conductive material, such as a polymer for example, and is contoured to provide strain relief at the first connector 84. In the illustrated, non-limiting embodiment, the sleeve 90, tip 92, and at least one ring 94 extend beyond an end of the housing 98, such as at a center thereof. Further, a protective or insulative cable 100 connected to or integrally formed with the housing 98 extends from the housing 98 to an end of the temperature probe 82. One or more wires (not shown) positioned within the cable 100 may be electrically connected to the one or more contactors 96 associated with or connected to the shaft 88, as well as to the temperature sensor or another component within the temperature probe 82.

As shown, the second connector 86 is arranged at a surface 102 of the cooking system 20, such as at the lid 24 or 40 for example. In the illustrated, non-limiting embodiment, surface 102 is the interior surface 48 of the inner lid liner 45 of lid 24. It should be understood that in other embodiments, surface 102 may be the interior surface of lid 40. Further, it should be understood that the second connector 86 may be located at any location about the interior of the cooking system 20, including a portion of the base 22. In each of the illustrated embodiments, the second connector 86 has a central opening 104 within which the shaft 88 of the first connector 84 is receivable. The second connector 86 defines a data receiving orifice configured to receive the data transmission end of the temperature probe 82.

Various configuration of the interface between the data transmission end or first connector 84 and the data receiving orifice or second connector 86 are contemplated herein. In the non-limiting embodiment of FIGS. 9, 10A, and 10B, a contour of the exterior of the housing 98 of the first connector 84 is complementary in size and shape to the central opening 104 formed in the second connector 86. Accordingly, when the first connector 84 and the second connector 86 are coupled, both the shaft 88 and a portion of the housing 98 are received within opening 104 of the second connector 86. Further, as shown, the housing 98 of the first connector 84 may include a radially outwardly extending protrusion or flange 106 receivable within a corresponding groove 108 formed at an interior surface of the second connector 86. This interface between the protrusion 106 and the groove 108 not only restricts movement of the first connector 84 relative to the second connector 86 but also forms a seal between the first and second connector 84, 86.

Figure 11:
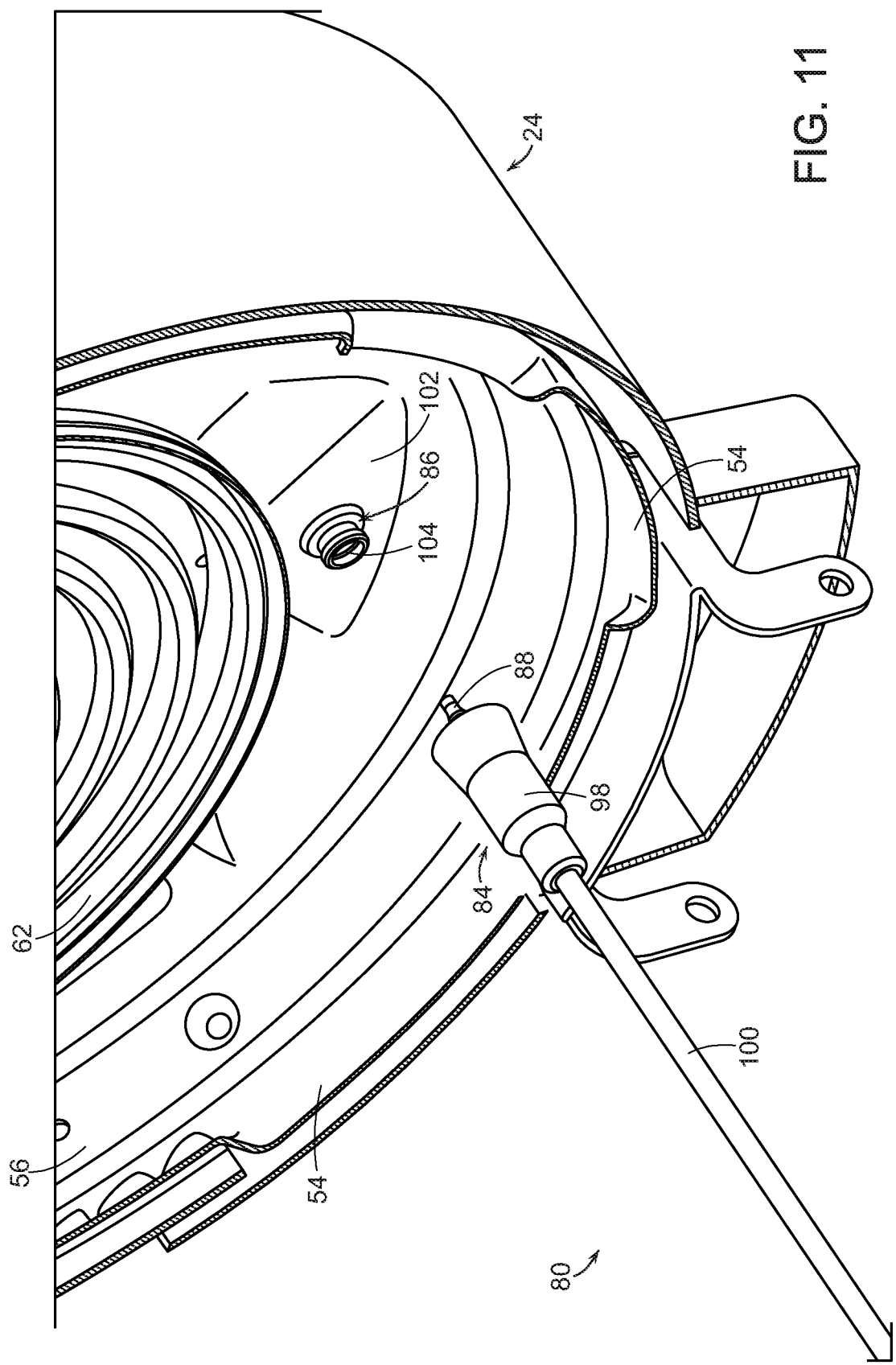
FIG. 11 is a perspective view of a portion of a temperature measurement system and a lid of the cooking system according to an embodiment.

In another embodiment, best shown in FIGS. 11, 12A, and 12B, only the shaft 88 of the first connector 84 is receivable within the opening 104 of the second connector 86. As shown, the housing 98 of the first connector 84 is receivable about an outer periphery of the second connector 86. In the illustrated, non-limiting embodiment, the exterior of a housing 110 of the second connector 86 includes a first plurality of threads 112 and the first connector 84 includes a coupling component 114 mounted concentrically about the shaft 88, having a second plurality of threads 116. When the first connector 84 and the second connector 86 are coupled, the coupling component 114 of the first connector 84 is threadably engaged with the housing 110 of the second connector 86. As a result, movement of the first connector 84 relative to the second connector 86 is restricted and a seal is formed between the second connector 86 and the coupling component 114. In an embodiment, an o-ring, gasket, or other sealing mechanism 118 is additionally formed at a face of the coupling component 114 configured to abut the surface 102 adjacent to the second connector 86. Inclusion of this sealing mechanism 118 prevents air from passing between the end of the first connector 84 and the lid 24.

Figure 13:
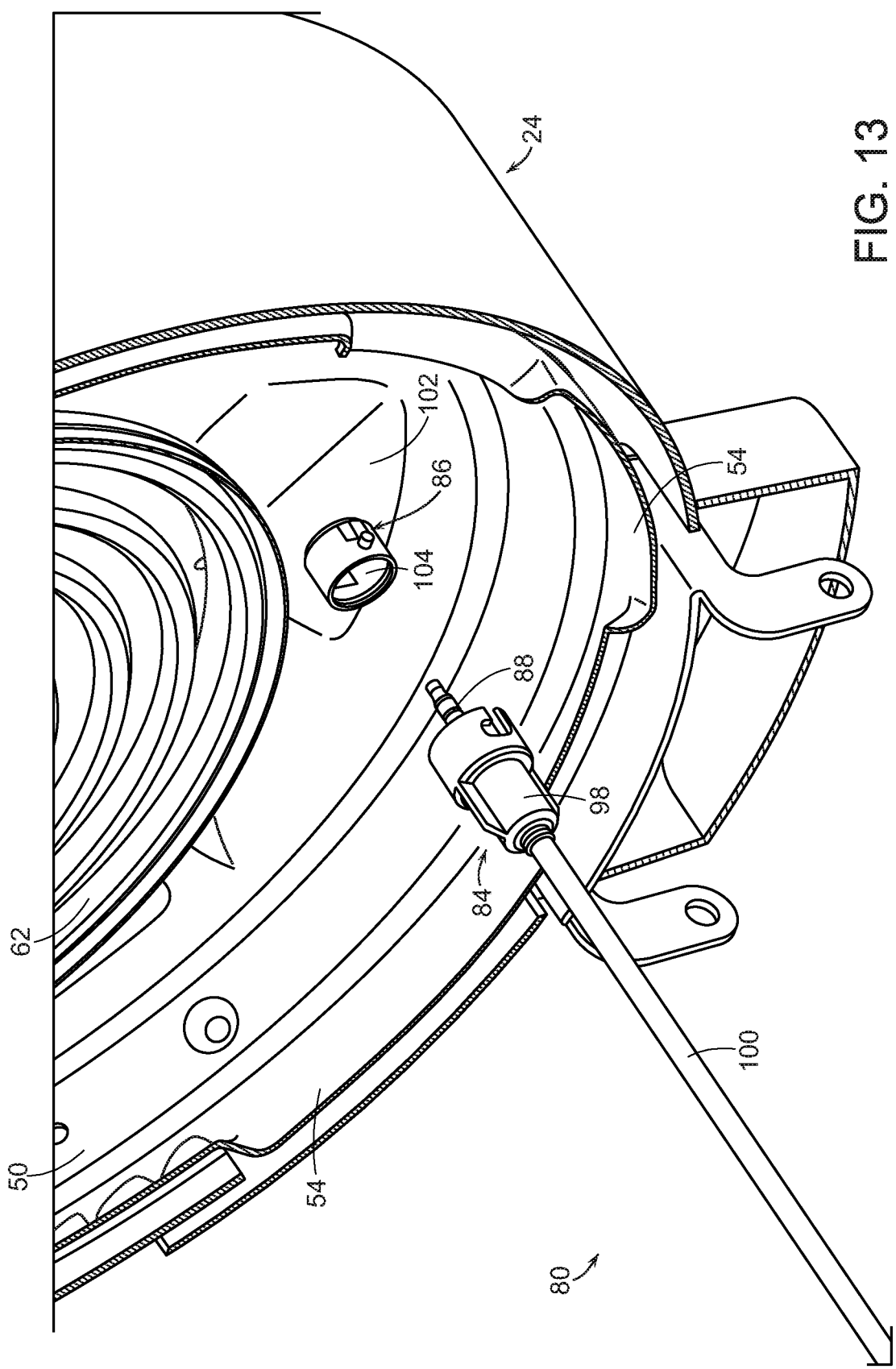
FIG. 13 is a perspective view of a portion of a temperature measurement system and a lid of the cooking system according to an embodiment.
Figure 14A:
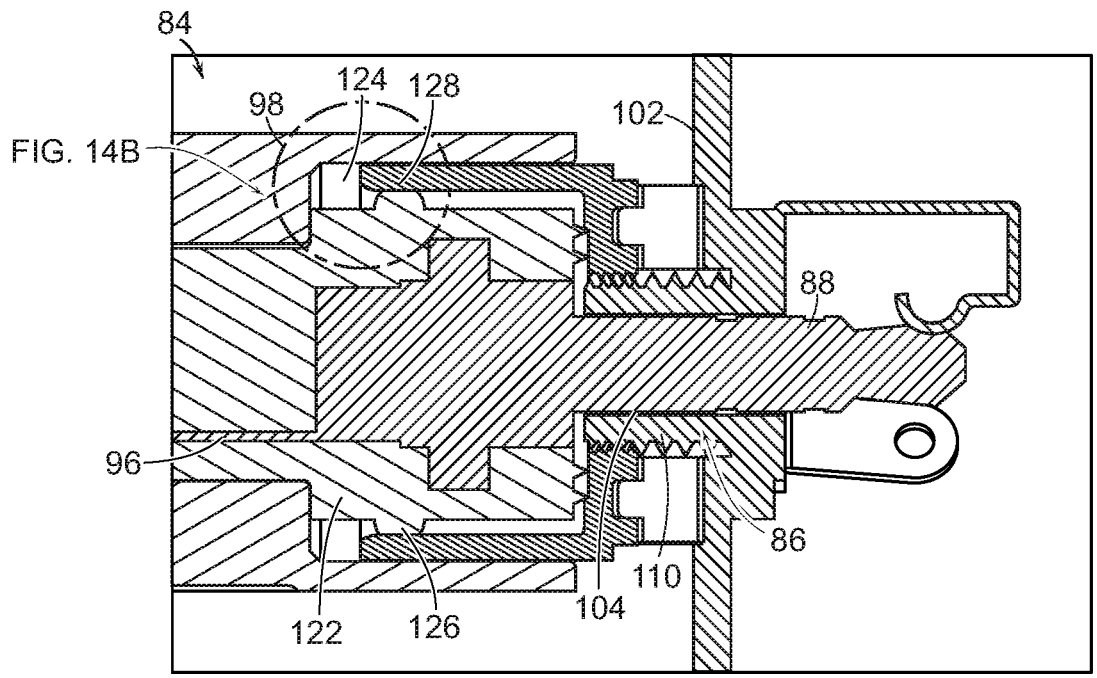
FIG. 14A is a cross-sectional view of a first connector and a second connector of the temperature measurement system of FIG. 13 according to an embodiment.
Figure 14B:
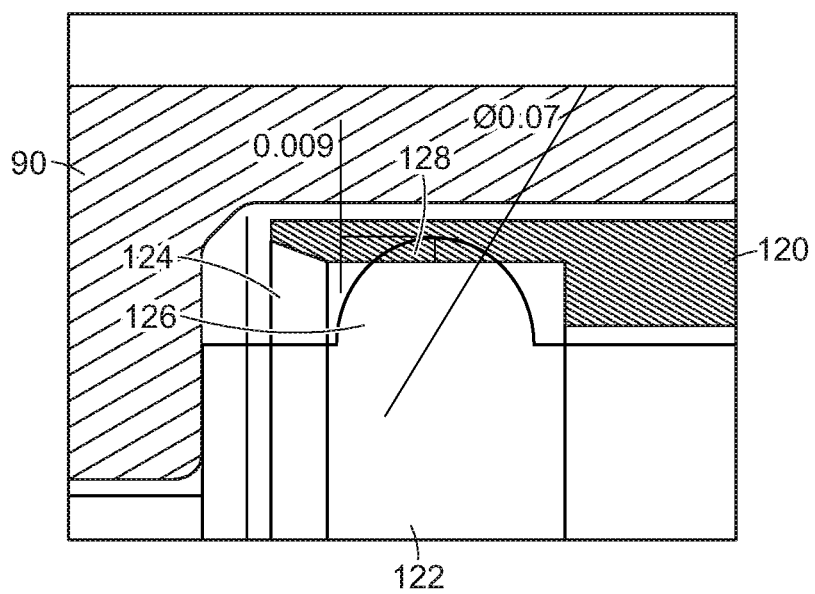
FIG. 14B is a detailed view of a portion of FIG. 14A according to an embodiment.

In yet another embodiment, illustrated in FIGS. 13, 14A, and 14B, the second connector 86 includes a coupling component 120 that extends substantially perpendicular to the surface 102 of the lid 24. Further, an end of the cable 100 includes a cable housing 122 arranged within the interior of the housing 98, and the shaft 88 may be directly coupled to the inner cable housing 122 rather than housing 98. In the illustrated, non-limiting embodiment, a clearance 124 is defined between an exterior surface of the inner cable housing 122 and an interior surface of the housing 98. When the first connector 84 and the second connector 86 are coupled, at least a portion of the coupling component 120 of the second connector 86 is received within the clearance 124 defined between the housing 98 and the inner cable housing 122. Further, in an embodiment, the inner cable housing 122 includes a radially outwardly extending protrusion or flange 126 receivable within a corresponding groove 128 formed at an interior surface of the coupling component 120. This interface between the protrusion 126 and the groove 128 restricts movement of the first connector 84 relative to the second connector 86 and forms a seal there between. Further, in each of the embodiments of FIGS. 8-14B, the increased pressure present within the cooking chamber during a pressure cooking operation exerts a force on the first connector 84, facilitating the formation of a seal at the interface between the first connector 84 and the second connector 86.

Figure 15:
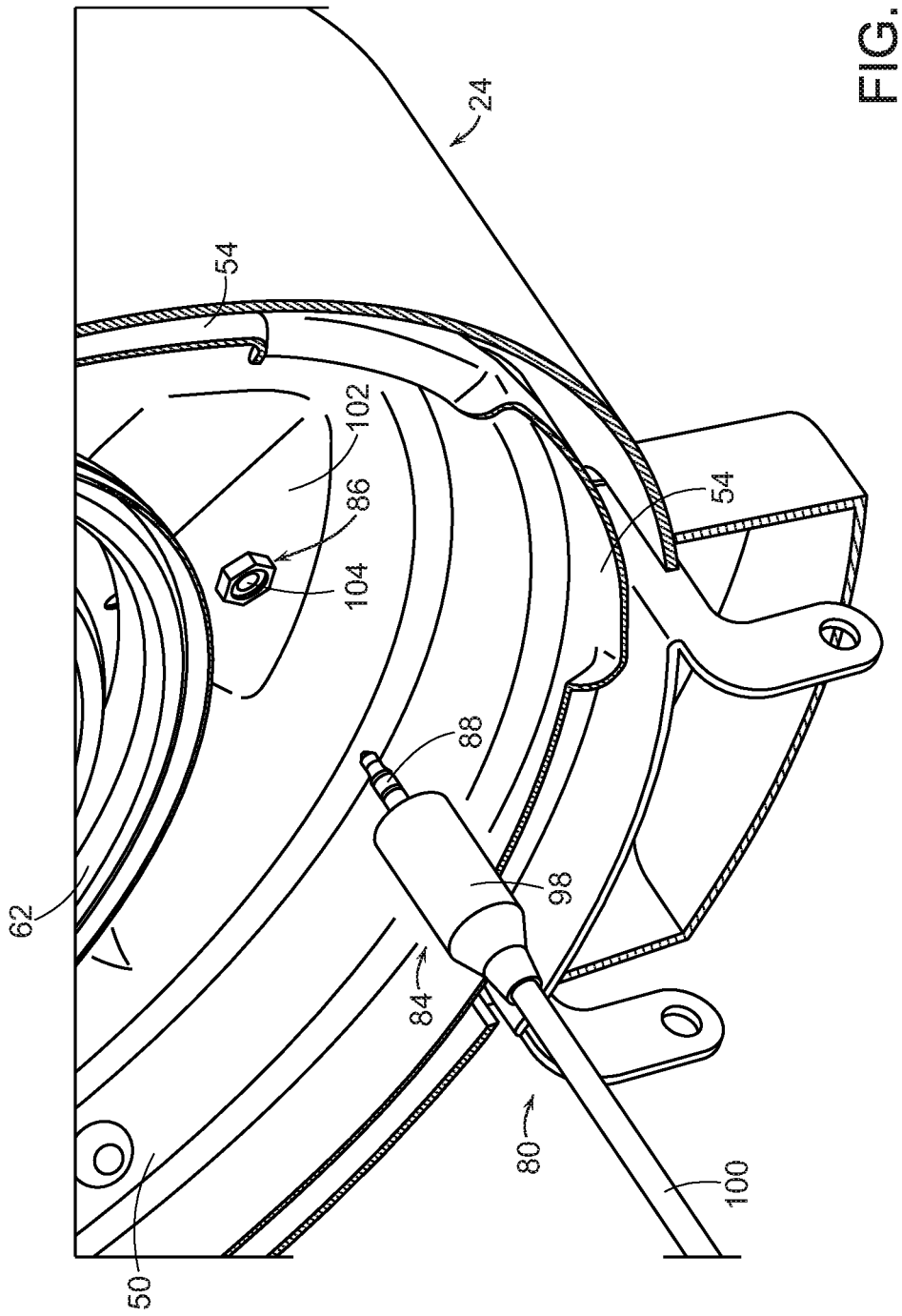
FIG. 15 is a perspective view of a portion of a temperature measurement system and a lid of the cooking system according to an embodiment.
Figure 16A:
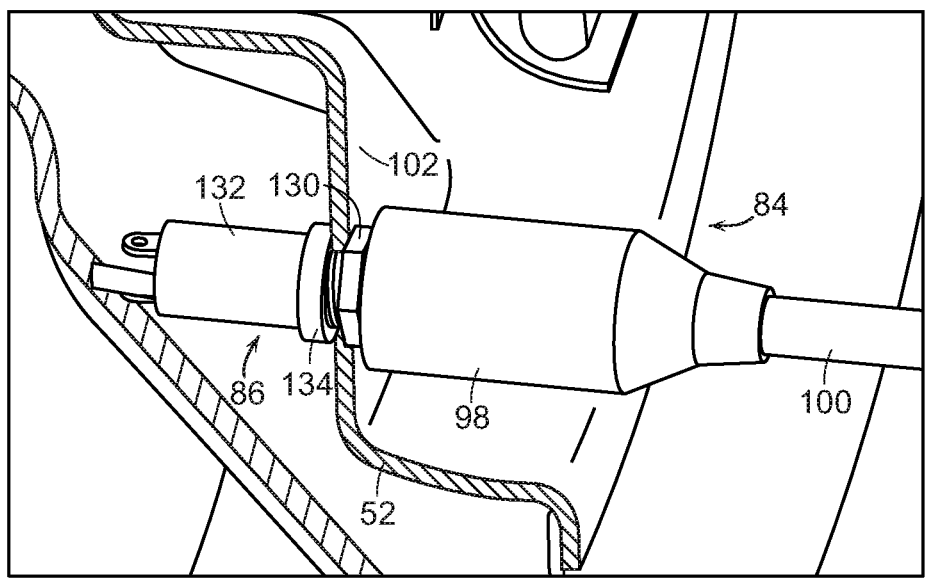
FIG. 16A is a perspective view of an interface between a first connector and a second connector of the temperature measurement system of FIG. 15 according to an embodiment.
Figure 16B:
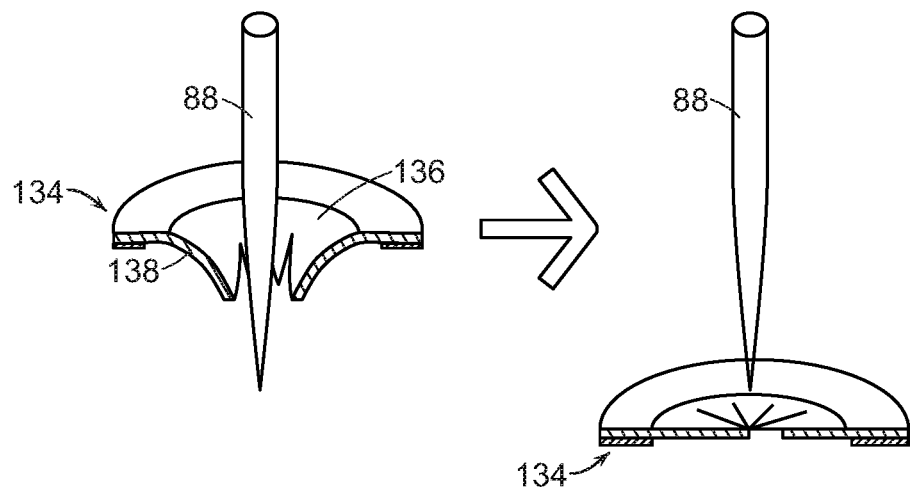
FIG. 16B is a detailed view of the interface of FIG. 16A according to an embodiment.

With reference now to FIGS. 15, 16A, and 16B, in yet another embodiment, the second connector 86 includes a housing 110 including a first portion 130 arranged adjacent the surface 102 of the inner lid liner 45 and a second portion 132 arranged adjacent an opposite side of the lid inner lid liner 45. In the illustrated, non-limiting embodiment, the second portion 132 of the housing 110 of the second connector 86 includes an at least partially hollow encapsulated socket. The interior of the encapsulated socket is constructed to have its own pressurized environment that is separate from and unaffected by the pressure of the surrounding environment within the lid.

The central opening 104 formed in the first portion 130 of the housing 110 is axially aligned with an opening or orifice (not shown) formed in the second portion 132 of the housing 110. Accordingly, the interior of the encapsulated socket is arranged in fluid communication with the cooking volume. As a result, regardless of the cooking operation being performed, a pressure within the interior of the encapsulated socket may be equal to the pressure within the cooking volume when the temperature probe 82 is not connected to the lid. The data transmission end 84 of the temperature probe 82 is insertable into the encapsulated socket via the data receiving orifice 86. When the temperature probe 82 is coupled to the encapsulated socket, the pressure within the encapsulated socket may remain equal to the pressure within the cooking volume. However, it should be understood that in other embodiments, insertion of the temperature probe 82 into the encapsulated socket may seal off the interior of the socket from the cooking volume.

In an embodiment, the second portion 132 of the housing 110 includes a face element 134 arranged in contact with the inner lid liner 45. The face element 134 is functions as a shield and is configured to prevent debris from entering into the interior of the encapsulated socket. As best shown in FIG. 16B, the face element 134 may be formed from a plurality of layers of material. For example, the face element 134 may include at least one layer of a low friction material 136, such as polyethylene terephthalate (PET), to facilitate insertion of the shaft into the second portion 132 of the housing 110. Alternatively, or in addition, the face element 134 may include one or more layers of resilient material 138, such as elastic or silicone for example, to allow the face element 134 to recover in response to insertion or removal of the shaft 88. Although the layer of low friction material 136 is illustrated as being positioned between the layer of resilient material 138 and the inner lid liner 45, embodiments where the layer of resilient material 138 is disposed between the layer of low friction material 136 and the inner lid liner 45 are also contemplated herein.

When the temperature probe 82 is affixed to the cooking system 20, the temperature probe may be configured to communicate with a controller of the cooking system 20. In some embodiments, the temperature may be sensed by the temperature sensor within the probe 82 using firmware, and/or the communication between the temperature probe 82 and the controller will occur via a hardwired connection, for example including one or more wires embedded within the lid. In other embodiments, the temperature measurement system 80 may be configured to communicate wirelessly with the controller. In such embodiments, the temperature measurement system 80 may communicate via any suitable communication protocol including but not limited to, a wireless network, bluetooth, or near field communication.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system having a temperature measurement system for measuring food temperature, the cooking system comprising:
    a housing defining a hollow chamber configured to receive food, and having a lid that defines a cooking volume within the hollow chamber when the lid is in a closed position relative to the housing;
    a temperature probe including a probe end insertable into food disposed within the hollow chamber, and a data transmission end; and
    a connector positioned within the hollow chamber on one of the housing and the lid, the connector including a data receiving orifice, said data transmission end of said temperature probe being insertable into said data receiving orifice, wherein the data receiving orifice of said connector is sealed from an environment of the housing or the lid surrounding said connector and is in fluid communication with the cooking volume when said data transmission end of said temperature probe is not inserted therein;
    wherein when said data transmission end of said probe is inserted into said data receiving orifice a pressure tight seal is formed in said data receiving orifice by the data transmission end of the temperature probe thereby isolating the data receiving orifice from the cooking volume.

2. The cooking system of claim 1, wherein said connector is an encapsulated socket.

3. The cooking system of claim 2, further comprising at least one heating element associated with at least one of said housing and said lid.

4. The cooking system of claim 1, wherein said connector is mounted within an interior of said lid.

5. The cooking system of claim 2, wherein said data transmission end is insertable into said data receiving orifice to seal said interior of said socket from said cooking volume.

6. The cooking system of claim 1, wherein said temperature probe is operable during a pressure cooking mode of the cooking system.

7. The cooking system of claim 6, wherein in said pressure cooking mode, a pressure of said cooking volume is at least 40 kPa.

8. The cooking system of claim 1, wherein said temperature probe is operable during an air fry mode of the cooking system.

9. A cooking system having a temperature measurement system for measuring food temperature, the cooking system comprising:
    a housing defining a sealable hollow chamber configured to receive food, the housing having a lid that defines a cooking volume within the sealable hollow chamber when the lid is in a closed position relative to the housing;
    a data port connector positioned in at least one of the lid and the housing, the data port connector having a central opening facing the sealable hollow chamber and being in electrical communication with a controller positioned in the housing; and a temperature probe having a probe end insertable into food during a cooking process and a data connector end insertable into the data port connector via the central opening, the data connector end being configured to form an interface with the data port connector and being configured to form a friction fit when the data connector end of the temperature probe is inserted into the data port connector, wherein the data port connector includes a face element configured to shield an interior of the data port connector when the data connector end of the temperature probe is not inserted therein; and wherein the face element is configured to flex to allow access to the central opening by the data connector end.

10. The cooking system of claim 9, wherein the face element comprises at least one of silicone, elastic, and polyethylene terephthalate.

11. The cooking system of claim 9, wherein the data connector end of the temperature probe mates to the data port connector via a bayonet mechanism.

12. The cooking system of claim 9, wherein the data connector end of the temperature probe mates to the data port connector via a bung mechanism.

13. The cooking system of claim 9, wherein the data port connector comprises an encapsulated socket having an internal pressure that is isolated from the sealable hollow chamber when the data connector end of the temperature probe is inserted therein.

14. The cooking system of claim 9, further comprising a heating element associated with at least one of the housing and the lid, and a fan disposed in the lid and in fluid communication with the sealable hollow chamber.

15. The cooking system of claim 9, wherein the data transmission end of a circumferential ridge extending from an exterior of the data connector end that creates a pressure tight friction fit.

\* \* \* \* \*